(12) United States Patent
Park et al.

(10) Patent No.: US 11,348,376 B2
(45) Date of Patent: May 31, 2022

(54) DISPLAY DEVICE AND METHOD OF ANTI-SPOOFING OF THE DISPLAY DEVICE

(71) Applicant: SAMSUNG ELECTRONICS CO., LTD., Suwon-si (KR)

(72) Inventors: Dongjin Park, Hwaseong-si (KR); Changeun Kang, Gimpo-si (KR); Moonkyu Song, Seoul (KR); Seongwook Song, Seoul (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 105 days.

(21) Appl. No.: 16/985,888

(22) Filed: Aug. 5, 2020

(65) Prior Publication Data

US 2021/0264181 A1    Aug. 26, 2021

(30) Foreign Application Priority Data

Feb. 20, 2020    (KR) .................. 10-2020-0020874

(51) Int. Cl.
  *G06V 40/40*    (2022.01)
  *G06K 9/62*    (2022.01)
  *G06V 40/13*    (2022.01)

(52) U.S. Cl.
  CPC ........... *G06V 40/40* (2022.01); *G06K 9/6257* (2013.01); *G06K 9/6262* (2013.01); *G06V 40/1318* (2022.01)

(58) Field of Classification Search
  CPC .. G06V 40/40; G06V 40/1318; G06K 9/6257; G06K 9/6262
  See application file for complete search history.

(56) References Cited

U.S. PATENT DOCUMENTS

| | | | |
|---|---|---|---|
| 5,828,773 A | 10/1998 | Setlak et al. | |
| 7,463,756 B2 | 12/2008 | Benkley, III | |
| 10,091,488 B2 | 10/2018 | Chen | |
| 10,282,582 B2 | 5/2019 | Setlak | |
| 11,233,682 B2 * | 1/2022 | Feher | ............... H04W 84/06 |
| 2018/0018495 A1 * | 1/2018 | Hung | ............ G06V 40/1318 |
| 2018/0357462 A1 | 12/2018 | Mackey et al. | |

(Continued)

FOREIGN PATENT DOCUMENTS

| | | |
|---|---|---|
| JP | 2008-129679 A | 6/2008 |
| JP | 2019-40897 A | 3/2019 |

(Continued)

*Primary Examiner* — Utpal D Shah
(74) *Attorney, Agent, or Firm* — Sughrue Mion, PLLC

(57) ABSTRACT

A display device is provided. The display device includes a display panel including a pixels; a fingerprint recognition sensor including an image sensor disposed under a first surface of the display panel; and a processor to control the display panel and the fingerprint recognition sensor. A portion of display pixels are configured to emit light in a fingerprint recognition mode. The image sensor includes pixels, at least a portion of the pixels are phase detection pixels. The image sensor generates a fingerprint image signal and a fingerprint phase signal based on reflected light received while the portion of display pixels emit light. The main processor is further configured to perform an anti-spoofing operation or a fingerprint authentication operation based on the fingerprint image signal and the fingerprint phase signal.

18 Claims, 22 Drawing Sheets

(56) References Cited

U.S. PATENT DOCUMENTS

| | | | |
|---|---|---|---|
| 2019/0220121 A1 | 7/2019 | Kim et al. | |
| 2019/0289235 A1* | 9/2019 | Nakamura et al. | |
| 2019/0303639 A1* | 10/2019 | He | G06V 40/1394 |
| 2019/0325190 A1* | 10/2019 | Cui | G06V 40/13 |
| 2020/0034602 A1* | 1/2020 | He | G06V 40/1324 |
| 2021/0117522 A1* | 4/2021 | He | G06F 21/32 |
| 2021/0174105 A1* | 6/2021 | He | G06V 40/1318 |
| 2021/0185284 A1* | 6/2021 | Chan | G01S 17/86 |
| 2022/0011889 A1* | 1/2022 | Shin | H01L 51/0097 |

FOREIGN PATENT DOCUMENTS

| | | |
|---|---|---|
| KR | 10-1797953 B1 | 11/2017 |
| KR | 10-2019-0018334 A | 2/2019 |
| KR | 10-2019-0023937 A | 3/2019 |

\* cited by examiner

| | PX11 | PX12 | | | | | | |
|---|---|---|---|---|---|---|---|---|
| | Gb | B | Gb | B | Gb | B | Gb | B |
| PX21 | R | Gr | R | Gr | R | Gr | R | Gr |
| PX22 | Gb | B | Gb | B | Gb | B | Gb | B |
| | R | Gr | R | Gr | R | Gr | R | Gr |
| | Gb | B | Gb | B | Gb | B | Gb | B |
| | R | Gr | R | Gr | R | Gr | R | Gr |
| | Gb | B | Gb | B | Gb | B | Gb | B |
| | R | Gr | R | Gr | R | Gr | R | Gr |

II — II'

DISPLAY DEVICE AND METHOD OF ANTI-SPOOFING OF THE DISPLAY DEVICE

CROSS-REFERENCE TO RELATED APPLICATION

This application claims priority from Korean Patent Application No. 10-2020-0020874, filed on Feb. 20, 2020 in the Korean Intellectual Property Office, the disclosure of which is incorporated herein by reference in its entirety.

BACKGROUND

Field

Methods and apparatuses consistent with example embodiments relate generally to semiconductor integrated circuits, and more particularly to display devices and methods of anti-spoofing of display devices.

Related Art

Biometric information is widely used in personal authentication because of its invariability and uniqueness. One type of biometric information is a fingerprint. Fingerprint recognition may be performed conveniently and serves as an excellent way of determining the identity of a person. Optical fingerprint recognition obtains a fingerprint image based on differences in light reflected by ridges and valleys of a finger.

Recently, spoofing attacks that counterfeit a user's fingerprint have increased.

SUMMARY

At least one example embodiment provides a display device capable of performing anti-spoofing operation and fingerprint authentication operation by using phase detection pixels.

At least one example embodiment provides a method of anti-spoofing in a display device that uses phase detection pixels.

According to example embodiments, a display device includes a display panel including a plurality of display pixels; a fingerprint recognition sensor including an image sensor disposed under a first surface of the display panel at a location corresponding to a fingerprint recognition window of the display panel; and a main processor configured to control the display panel and the fingerprint recognition sensor. A portion of display pixels among the plurality of display pixels are configured to emit light in a fingerprint recognition mode, the portion of display pixels corresponding to the fingerprint recognition window, the image sensor includes a pixel array including a plurality of pixels, at least a portion of the plurality of pixels includes phase detection pixels, and the image sensor is configured to generate a fingerprint image signal and a fingerprint phase signal based on reflected light of a fingerprint received through the fingerprint recognition window while the portion of display pixels emit light. The main processor is further configured to perform any one or any combination of an anti-spoofing operation and a fingerprint authentication operation based on the fingerprint image signal and the fingerprint phase signal, the anti-spoofing operation being associated with determining whether the fingerprint is counterfeited.

According to example embodiments, there is provided method of anti-spoofing of a display device including a fingerprint recognition sensor having a pixel array and a display panel including a plurality of display pixels. The method includes training a main processor by sequentially inputting a user fingerprint and a fake fingerprint to the fingerprint recognition sensor while a portion of display pixels, from among the plurality of display pixels, emit light, the portion of display pixels corresponding to a fingerprint recognition window of the display panel; generating, by the main processor, learning data including a fingerprint image signal and a fingerprint phase signal based on the training; generating, by the fingerprint recognition sensor, an input fingerprint image signal and an input fingerprint phase signal based on an input fingerprint; and authenticating, by the main processor, the input fingerprint by comparing the input fingerprint image signal and the input fingerprint phase signal with the learning data.

According to example embodiments, a display device includes a display panel including a plurality of display pixels; a fingerprint recognition sensor including an image sensor disposed under a first surface of the display panel at a location spatially corresponding to a fingerprint recognition window of the display panel; and a main processor configured to control the display panel and the fingerprint recognition sensor. A portion of display pixels among the plurality of display pixels are configured to emit light in a fingerprint recognition mode, the portion of display pixels corresponding to the fingerprint recognition window, the image sensor includes a pixel array including a plurality of pixels, at least a portion of the plurality of pixels includes phase detection pixels and the image sensor is configured to generate a fingerprint image signal and a fingerprint phase signal based on reflected light of a fingerprint, received through the fingerprint recognition window while the portion of display pixels emit light, and the main processor is further configured to: perform any one or any combination of an anti-spoofing operation and a fingerprint authentication operation based on the fingerprint image signal and the fingerprint phase signal, the anti-spoofing operation being associated with determining whether the fingerprint is counterfeited; perform training to generate learning data based on a first fingerprint image signal and a first fingerprint phase signal generated by the image sensor according to a user fingerprint, and based on a second fingerprint image signal and a second fingerprint phase signal generated by the image sensor according to a fake fingerprint; and perform the anti-spoofing operation by comparing the fingerprint image signal and the fingerprint phase signal corresponding to the fingerprint with the learning data.

According to example embodiments, the pixel array in the fingerprint recognition generates the fingerprint image signal and the fingerprint phase signal using at least a portion of the pixels and the main processor performs the anti-spoofing operation to determine whether the fingerprint is counterfeited and the fingerprint authentication operation based on the fingerprint image signal and the fingerprint phase signal. Therefore, the display device may identify two-dimensional fake fingerprint based on the fingerprint phase signal, and thus enhance performance of the anti-spoofing.

BRIEF DESCRIPTION OF THE DRAWINGS

The above and other aspects, features and advantages will be more clearly understood from the following description of example embodiments, taken in conjunction with the accompanying drawings, in which:

FIG. 10 is a block diagram illustrating another example of the pixel array in the display device of FIG. 4 according to example embodiments.

DETAILED DESCRIPTION

Figure 1:
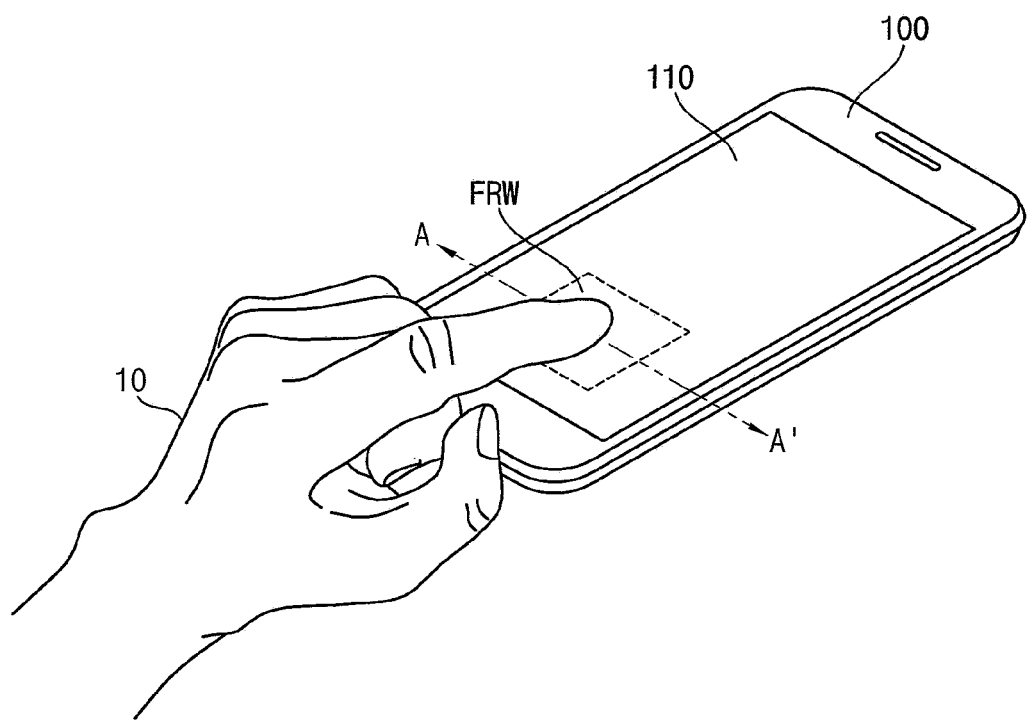
FIG. 1 is a diagram illustrating an example of a display device which performs a function of anti-spoofing and fingerprint detection according to example embodiments.

Example embodiments will be described more fully with reference to the accompanying drawings. The present disclosure may, however, be embodied in many different forms and should not be construed as limited to the example embodiments set forth herein. Like reference numerals refer to like elements throughout this application.

FIG. 1 is a diagram illustrating an example of a display device which performs a function of anti-spoofing and fingerprint detection according to example embodiments.

In some example embodiments, a display device 100 may be implemented with a mobile electronic device such as a smart phone, a tablet computer, a wearable device, or the like.

Referring to FIG. 1, the display device 100 may include a panel 110 to interface with a user. The user of the display device 100 may view information output from the display device 100 through the panel 110. The user of the display device 100 may input a signal to the display device 100 through the panel 110. To this end, for example, the panel 110 may include a display panel for outputting visual information to the user, a touch sensor panel for sensing a touch input of the user, and/or the like. The display panel may be an organic light-emitting diode display panel.

In some example embodiments, a fingerprint recognition window FRW may be provided on the panel 110. A fingerprint recognition sensor including an image sensor for fingerprint detection, which will be described with reference to FIGS. 2 and 3, may be disposed under the panel 110. The image sensor for fingerprint detection may be disposed to spatially correspond to a location of the fingerprint recognition window FRW.

The location of the fingerprint recognition window FRW and arrangement of the image sensor may be variously modified or changed. FIG. 1 illustrates that the fingerprint recognition window FRW is provided in a lower region on the panel 110. However, in some example embodiments, the fingerprint recognition window FRW may be provided in a middle or upper region on the panel 110. The location and a size of the fingerprint recognition window FRW may be changed depending on the arrangement of the image sensor.

The display device 100 may perform a function of fingerprint detection and anti-spoofing to provide an authenticated user with a service. The anti-spoofing is associated with determining whether an input fingerprint is counterfeited.

The display device 100 may collect and store information associated with a fingerprint of the user. The display device 100 may provide a service only to a user who is authenticated based on the stored fingerprint information. The display device 100 may use an image sensor disposed under the panel 110 to detect the fingerprint of the user.

The user of the display device 100 may contact (or approach) the display device 100 through an object 10. For example, the object 10 may include a finger of the user. The display device 100 may recognize the object 10 in response to contact or proximity of the object 10 with respect to the panel 110.

For example, the finger of the user may contact or approach the fingerprint recognition window FRW. The image sensor for fingerprint detection may be disposed to spatially correspond to the location of the fingerprint recognition window FRW, and thus the image sensor may obtain an image associated with a fingerprint of a finger which contacts or approaches the fingerprint recognition window FRW. The display device 100 may determine, based on the obtained image, whether the fingerprint of the finger which contacts or approaches the fingerprint recognition window FRW is a fingerprint of an authenticated user.

The interface and the fingerprint recognition sensor used for fingerprint detection may share an area on the display device 100 with the touch panel and the display panel, and thus the interface and the fingerprint recognition sensor may not require an additional area on the display device 100. Accordingly, it may be possible to reduce the size of the display device 100, or a spare area may be used for other purpose(s).

Figure 2:
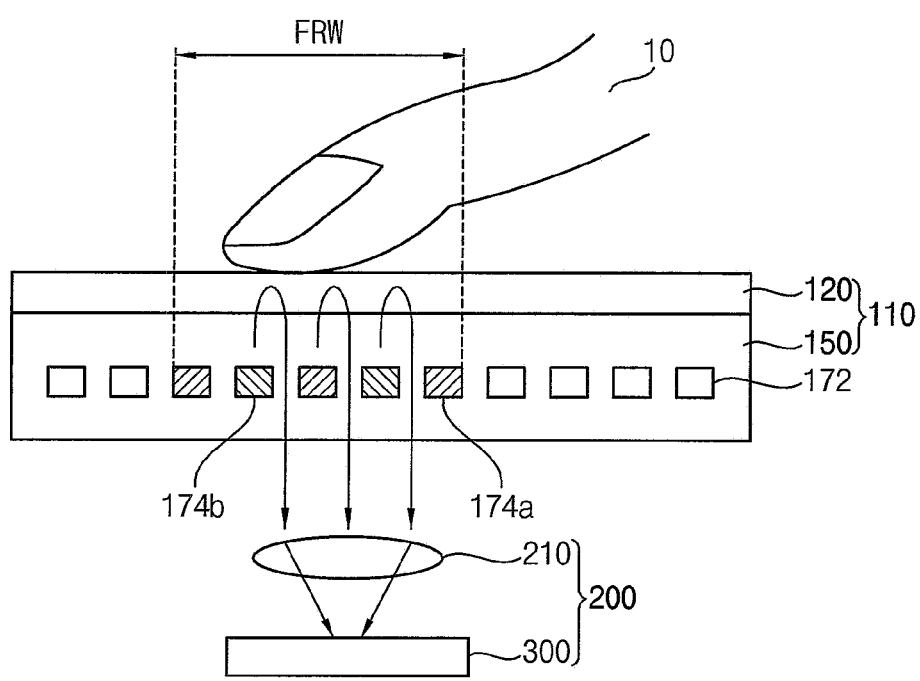
FIG. 2 is a cross-sectional view of an example of the display device taken along a line A-A' of FIG. 1.

FIG. 2 is a cross-sectional view of an example of the display device taken along a line A-A' of FIG. 1.

Referring to FIG. 2, the panel 110 includes a display panel 150 and a touch panel 120. The fingerprint recognition window FRW may be displayed on a partial region (or portion) of the display panel 150 in a fingerprint recognition mode. The display panel 150 may include a plurality of light sources 172. For example, the plurality of light sources 172 may be included in a plurality of display pixels included in the display panel 150.

Among the plurality of light sources 172, only some light sources 174a and 174b that are disposed to correspond to the fingerprint recognition window FRW may be driven substantially simultaneously in the fingerprint recognition mode. In FIG. 2, the light sources 174a and 174b that are driven and emit light are hatched.

A fingerprint recognition sensor 200 may be disposed under the display panel 150 such that the fingerprint recognition sensor 200 may overlap the fingerprint recognition window FRW in a vertical direction. In other words, the display panel 150 may include a first surface on which an image is displayed and a second surface opposite to the first surface and the fingerprint recognition sensor 200 may be disposed under the second surface of the display panel 150.

The fingerprint recognition sensor 200 may include a lens 210 and an image sensor 300.

The lens 210 may be disposed under the display panel 150 (e.g., interposed between the display panel 150 and the image sensor 300), and may concentrate reflected light received through the fingerprint recognition window FRW on the image sensor 300. The image sensor 300 may be disposed under the lens 210, and may generate an image signal corresponding to an object on the partial region based on the reflected light concentrated by the lens 210. The fingerprint recognition sensor 200 may be implemented in the form of a compact camera module (CCM) including the lens 210 and the image sensor 300.

For example, as illustrated in FIG. 2, when a user puts a finger 10 on the fingerprint recognition window FRW, the light generated from the light sources 174a and 174b within the fingerprint recognition window FRW may be reflected by a fingerprint of the finger 10, and the reflected light of the fingerprint may be provided to the fingerprint recognition sensor 200. The fingerprint recognition sensor 200 may capture an image signal corresponding to the fingerprint or information associated with a shape of the fingerprint (e.g., a fingerprint image) based on the reflected light of the fingerprint received through the fingerprint recognition window FRW.

The fingerprint recognition sensor 200 may further include a filter for adjusting a frequency characteristic and/or a polarization characteristic of the reflected light which is to be provided to the image sensor 300.

Figure 3:
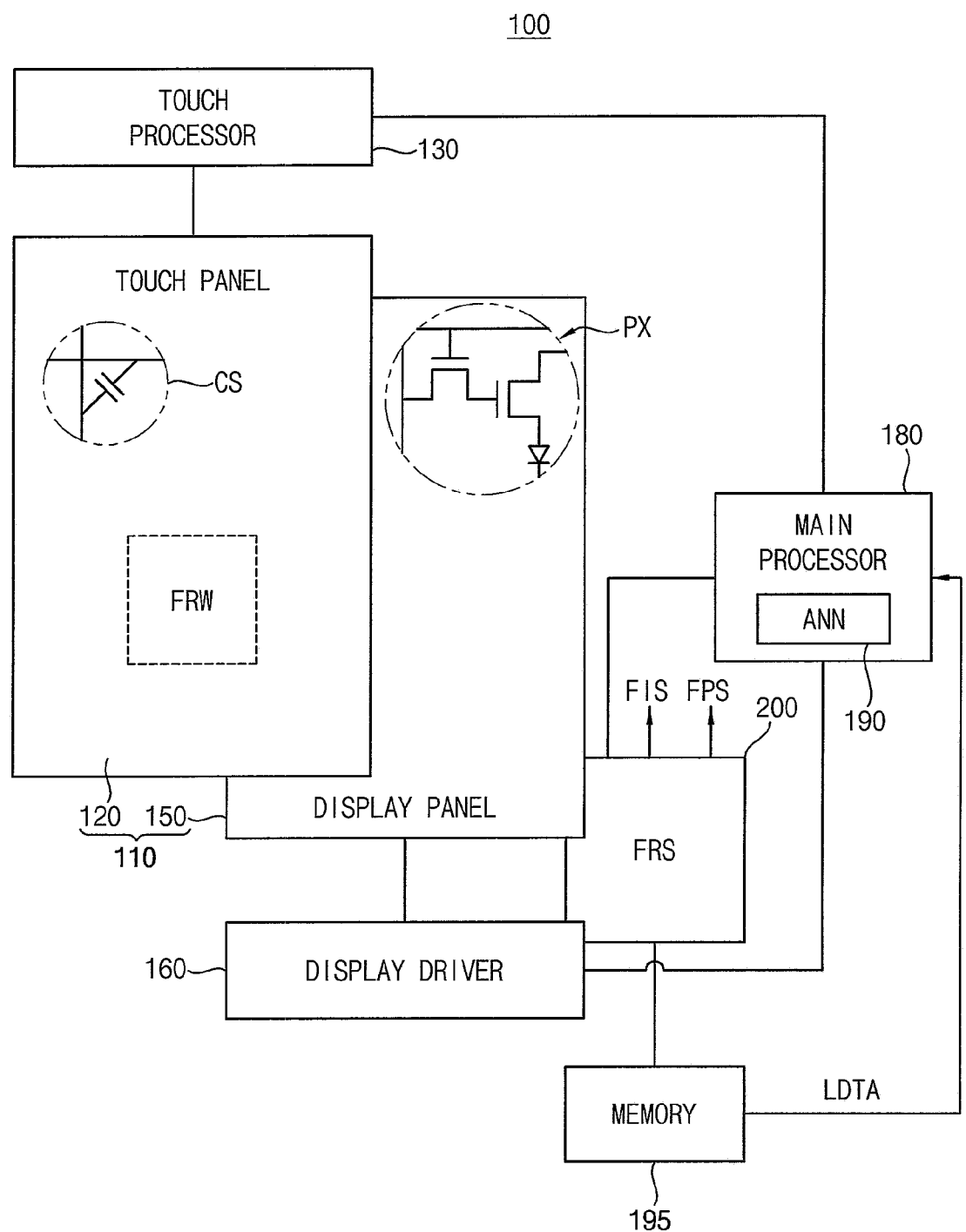
FIG. 3 is a block diagram illustrating an example of the display device of FIG. 1 according to example embodiments.

FIG. 3 is a block diagram illustrating an example of the display device of FIG. 1 according to example embodiments.

Referring to FIG. 3, the display device 100 may include the panel 110 and the fingerprint recognition sensor 200. The panel 110 includes touch panel 120 and a display panel 150 and the display device 100 may further include touch processor 130, a display driver 160, a main processor 180 and a memory 195. The main processor 180 may include an artificial neural network engine (ANN) 190.

The touch panel 120 may sense contact or proximity of an object (e.g., a finger of the user). For example, the touch panel 120 may generate a sensing signal, in response to the contact or proximity of the object. In some example embodiments, the touch panel 120 may include a plurality of sensing capacitors which are formed along rows and columns. FIG. 3 illustrates one example sensing capacitor CS. A capacitance value of the sensing capacitor CS may vary in response to the contact or proximity of the object.

The touch processor 130 may control operations of the touch panel 120. The touch processor 130 may process an operation associated with the contact or proximity of the object, based on the sensing signal output from the touch panel 120.

For example, the touch processor 130 may recognize the contact or proximity of the object, based on variation in the capacitance value of the sensing capacitor CS. For example, when the sensing signal is associated with execution or operation of a specific application, the touch processor 130 may output a command to the main processor 180 such that the specific application is to be executed or to operate.

The display panel 150 may output visual information for the user. The display panel 150 may include a plurality of pixels which are arranged along rows and columns to display an image. FIG. 3 illustrates one example pixel PX. Each pixel may be configured to emit light of a specific color which forms a portion of the image. As the plurality of pixels emit light together, the display panel 150 may display an intended image.

In some example embodiments, the display panel 150 may be an electroluminescent display panel. The electroluminescent display panel may be driven with rapid response speed and low power consumption using a light emitting diode (LED) or an organic light emitting diode (OLED) that generates light by recombination of electrons and holes.

In comparison with a liquid crystal display panel using a backlight unit, the pixels PX of the electroluminescent display panel may emit light by themselves, and the reflected light received through the fingerprint recognition window FRW may be provided to the fingerprint recognition sensor 200 under the display panel 150 through a space (gap) between the pixels PX.

Thus, light emitting diodes or organic light emitting diodes included in the pixels PX may correspond to the light sources included in the display panel according to example embodiments. However, example embodiments are not limited thereto, and the display panel 150 may be any display panel having a structure in which the reflected light received through the fingerprint recognition window FRW may be provided to the fingerprint recognition sensor 200.

The display driver 160 may control operations of the display panel 150 and may drive the display panel 150. For example, the display driver 160 may suitably drive each pixel of the display panel 150 in response to a command of the main processor 180 such that the desired or intended image is displayed on the display panel 150. For example, the display driver 160 may partially drive the display panel 150 such that pixels corresponding to the fingerprint recognition window FRW emit light. The display driver 160 may include a data driver, a scan driver, a timing controller, a gamma circuit, etc.

The fingerprint recognition sensor 200 may be used to detect a fingerprint. The fingerprint recognition sensor 200 may generate/output an image signal associated with an object which is on the fingerprint recognition window FRW. For example, the fingerprint recognition sensor 200 may operate to provide an image signal associated with a fingerprint of a finger which contacts or approaches the fingerprint recognition window FRW.

As described with reference to FIG. 2, the fingerprint recognition sensor 200 may include the lens 210 and the image sensor 300. In addition, the image sensor 300 may include a pixel array having a plurality of pixels, may generate a fingerprint image signal FIS and a fingerprint phase signal FPS associated with a fingerprint of a finger by using at least a portion of the plurality of pixels as phase detection pixels, and may provide the main processor 180 with the fingerprint image signal FIS and the fingerprint phase signal FPS.

The fingerprint recognition sensor 200 may provide a function of optical fingerprint recognition or optics-based fingerprint detection. For example, the image sensor 300 included in the fingerprint recognition sensor 200 may include photoelectric conversion elements such as photodiode(s) which is capable of generating current in response to light.

The main processor 180 may control overall operations of the display device 100. The main processor 180 may process/perform various arithmetic/logical operations to provide functions of the display device 100.

The main processor 180 may communicate with the display driver 160, the fingerprint recognition sensor 200 and the memory 195. The main processor 180 may control operations of the display driver 160, the fingerprint recognition sensor 200 and the memory 195. The main processor 180 may process commands, requests, responses, and/or the like, which are associated with operations of the display driver 160, the fingerprint recognition sensor 200 and the memory 195.

For example, the main processor 180 may provide a variety of information to the display driver 160, to display the desired or intended image on the display panel 150. For example, the main processor 180 may control an operation timing/sequence of the display panel 150 and the fingerprint recognition sensor 200 such that the fingerprint recognition sensor 200 generates the fingerprint image signal FIS and the fingerprint phase signal FPS. The main processor 180 may perform an anti-spoofing operation and/or a fingerprint authentication operation on the input fingerprint based on the fingerprint image signal FIS and the fingerprint phase signal FPS output from the fingerprint recognition sensor 200. For example, the main processor 180 may store associated data in the memory 195 or may load the associated data from the memory 195.

For example, the ANN 190 in the main processor 180, in a training mode, may perform a training (machine learning) based on a first fingerprint image signal and a first fingerprint phase signal generated by the image sensor 300 in response to a user's fingerprint and based on a second fingerprint image signal and a second fingerprint phase signal generated by the image sensor 300 in response to a fake fingerprint to generate learning data LDTA based on a result of the training, and may store the memory 195. The first fingerprint phase signal may include three dimensional information such as phase information and/or depth information on the user's input.

For example, the main processor, in a fingerprint authentication mode, may perform determining whether the input fingerprint is counterfeited (anti-spoofing) and/or authentication of the input fingerprint by comparing the fingerprint image signal and the fingerprint phase signal generated by the image sensor 300 responding to the input fingerprint with the learning data LDTA.

In some example embodiment, the main processor 180, in the training mode, may consecutively store the first fingerprint image signal and the first fingerprint phase signal generated by the image sensor 300 when the user's finger contacts or approaches the fingerprint recognition window FRW during a reference time interval, may generate the learning data LDTA based on a change of the first fingerprint image signal and the first fingerprint phase signal, and may store the learning data LDTA in the memory 195. In the fingerprint authentication (certification) mode, the main processor 180 may monitor the input fingerprint on the fingerprint recognition window FRW during the reference time interval, and may perform an anti-spoofing operation to determine whether the input fingerprint is counterfeited and/or a fingerprint authentication operation to authenticate the input fingerprint based on change of an input fingerprint image signal and an input fingerprint phase signal, and change of the first fingerprint image signal and the first fingerprint phase signal. That is, the main processor 180 may perform the anti-spoofing (operation) based on the change of the first fingerprint image signal and the first fingerprint phase signal by monitoring the user's fingerprint on the fingerprint recognition window FRW during the reference time interval.

The anti-spoofing based on the change of fingerprint signal is possible because a change of a fake fingerprint based on the fake fingerprint making contact with the fingerprint recognition window FRW during the reference time interval is little or very small in comparison with the user's fingerprint. That is, change of the valley and the ridge of the fake fingerprint during the reference time interval is little or very small in comparison with a change of the valley and the ridge of the user's fingerprint.

In some example embodiments, the main processor 180 may include one or more special-purpose circuits (e.g., a field programmable gate array (FPGA), application specific integrated chips (ASICs), and/or the like) to perform various operations. For example, the main processor 180 may include one or more processor cores which are capable of performing various operations. For example, the main processor 180 may be implemented with a general-purpose processor, a special-purpose processor, or an application processor.

The memory 195 may store data related to the operation of the display device 100. For example, the memory 195 may store the learning data LDTA for anti-spoofing according to example embodiments.

In some example embodiments, the memory 195 may include at least one of various volatile memories such as a dynamic random access memory (DRAM), a static random access memory (SRAM), or the like, and/or at least one of various nonvolatile memories such as a flash memory, a phase change random access memory (PRAM), a resistance random access memory (RRAM), a magnetic random access memory (MRAM), a ferroelectric random access memory (FRAM), a nano floating gate memory (NFGM), a polymer random access memory (PoRAM), or the like.

In some example embodiments, the touch processor 130, the display driver 160, the fingerprint recognition sensor 200, the main processor 180 and the memory 195 may be respectively implemented with separate circuits/modules/chips. In other example embodiments, on the basis of a function, some of the touch processor 130, the display driver 160, the fingerprint recognition sensor 200, the main processor 180 and the memory 195 may be combined into one circuit/module/chip, or may be further separated into a plurality of circuits/modules/chips.

Figure 4:
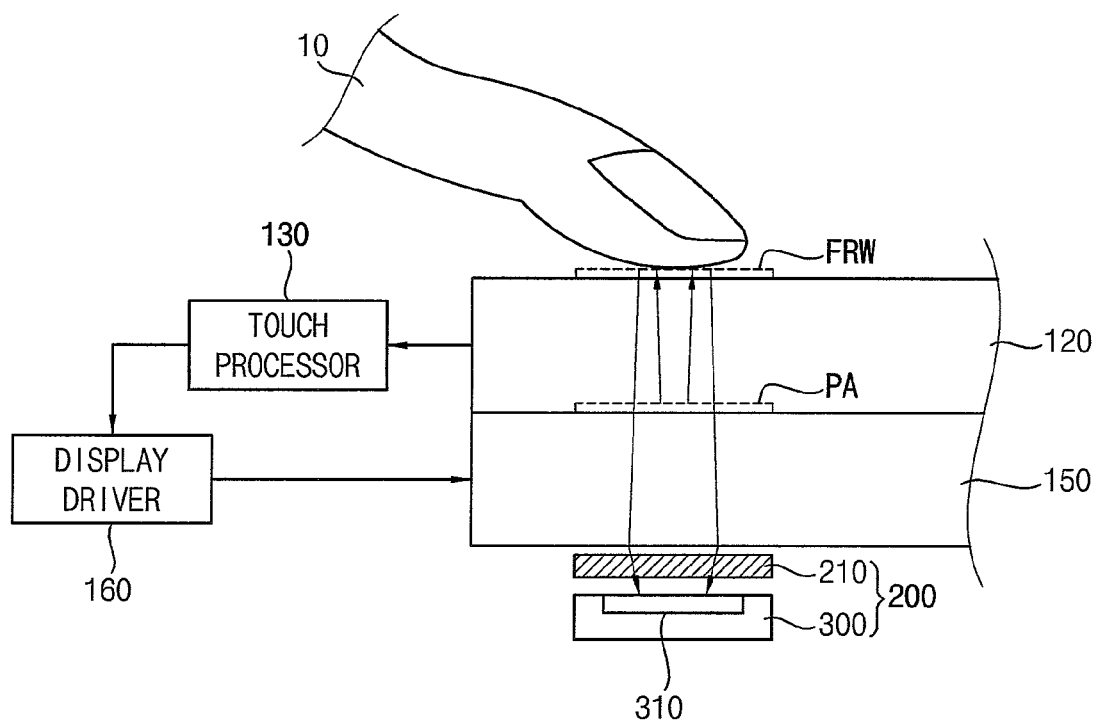
FIG. 4 is a diagram describing an example configuration and an example operation of the display device of FIG. 3 according to example embodiments.

FIG. 4 is a diagram describing an example configuration and an example operation of the display device of FIG. 3 according to example embodiments.

Referring to FIG. 4, the user of the display device 100 may contact or approach the fingerprint recognition window FRW on the touch panel 120 through the object (e.g., a finger). The touch processor 130 may recognize the contact or proximity of the object with respect to the fingerprint recognition window FRW, based on variations in capacitance values of sensing capacitors which correspond to the fingerprint recognition window FRW.

When the touch processor 130 recognizes the contact or proximity of the object with respect to the fingerprint recognition window FRW, the touch processor 130 may output a control signal for driving the display driver 160. In some example embodiments, the touch processor 130 may provide the control signal directly to the display driver 160. In some example embodiments, the control signal output from the touch processor 130 may be indirectly provided to the display driver 160 through other component(s) such as the main processor 180 in FIG. 3.

The display driver 160 may drive the display panel 150 based on the control signal output from the touch processor 130. The pixels included in the display panel 150 may emit light under control of the display driver 160.

In some example embodiments, the display driver 160 may partially drive the display panel 150, based on the control signal output from the touch processor 130, such that the pixels corresponding to a partial area PA on the display panel 150 emit light. That is, under control of the display driver 160, the display panel 150 may emit light through pixels which spatially correspond to a location at which the image sensor 300 is disposed. The image sensor 300 may include a pixel array 310 having a plurality of pixels. The lens 210 may be interposed between the display panel 150 and the image sensor 300.

The light emitted from the display panel 150 may be projected to the object 10 which is on the fingerprint recognition window FRW. The projected light may be reflected by the object 10. The reflected light may be provided to the image sensor 300, and the image sensor 300 may generate/output an image signal based on the reflected light incident thereon. Accordingly, the image sensor 300 may output the image signal associated with the object 10 which is on the fingerprint recognition window FRW, based on the light emitted from the display panel 150. For example, when the object 10 is a finger, the image signal may include information associated with a shape of a fingerprint.

Figure 5:
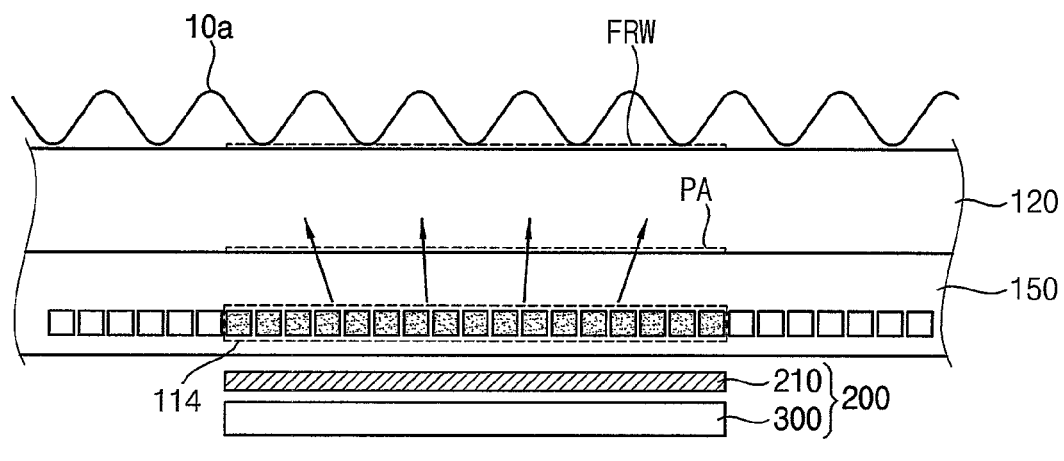
FIG. 5 is a conceptual diagram for describing the example configuration and the example operation of FIG. 4 in detail.

FIG. 5 is a conceptual diagram for describing the example configuration and the example operation of FIG. 4 in detail.

Referring to FIG. 5, as the object 10 contacts or approaches the fingerprint recognition window FRW on the touch panel 120, a fingerprint 10a may contact or approach the fingerprint recognition window FRW. When the contact or proximity is sensed, the display panel 150 may emit light through pixels to generate an image signal associated with the fingerprint 10a. The emitted light may be reflected from the fingerprint 10a, and the image sensor 300 may receive the reflected light to output the image signal. The image signal may be used to generate an image associated with the fingerprint 10a or to analyze information associated with the fingerprint 10a.

In some example embodiments, the display panel 150 may emit light through pixels 114 which correspond to the partial area PA.

Figure 6:
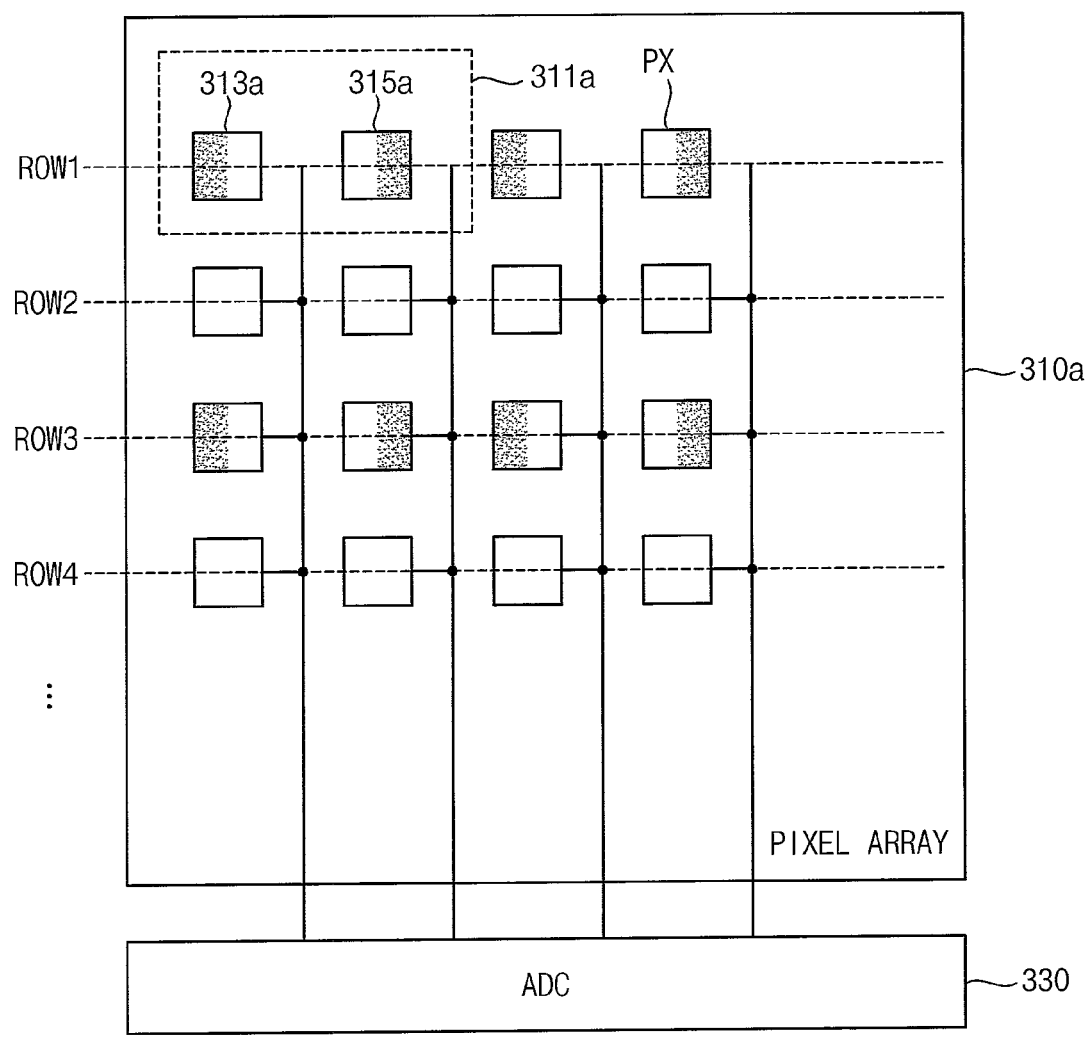
FIG. 6 is a block diagram illustrating an example of the pixel array in the display device of FIG. 4 according to example embodiments.
Figure 7:
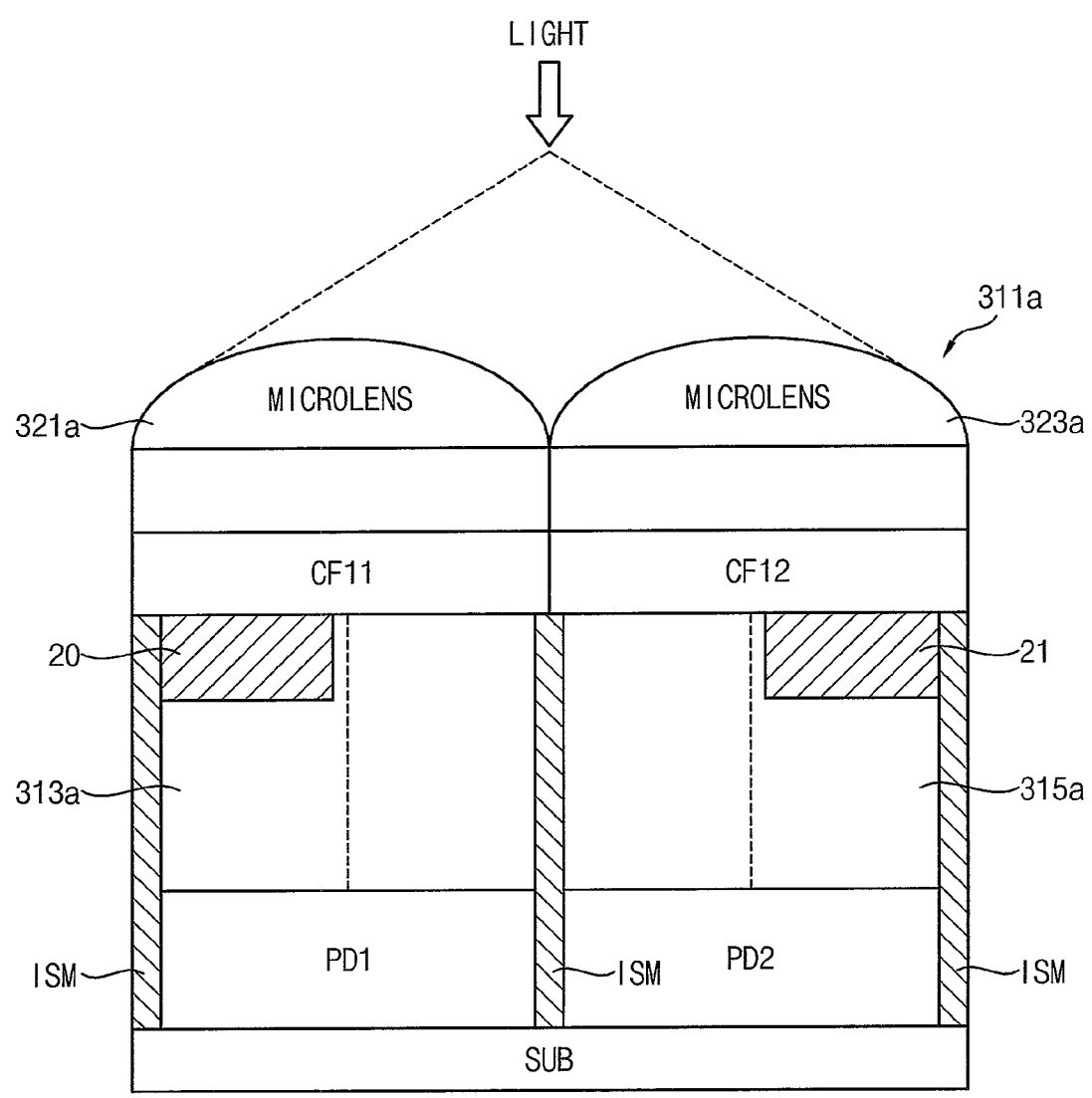
FIG. 7 is a cross-sectional view of an example of a pixel belonging to a sub-pixel group in FIG. 6.

FIG. 6 is a block diagram illustrating an example of the pixel array in the display device of FIG. 4 according to example embodiments. FIG. 7 is a cross-sectional view of an example of a pixel belonging to a sub-pixel group in FIG. 6.

In FIG. 6, a pixel array 310a is illustrated together with an analog-to-digital converter (ADC) block 330.

Referring to FIG. 6, the pixel array 310a may include a plurality of pixels PX corresponding to a plurality of row lines ROW1, ROW2, ROW3, ROW4, etc. The plurality of pixels PX may respectively include a plurality of photodiodes.

Each of the photodiodes included in the pixel array 310a may be an example of a photoelectric conversion element, and may be replaced with, for example, a phototransistor, a photogate, or a pinned-photodiode.

The plurality of photodiodes included in the plurality of pixels PX may independently capture light.

According to some example embodiments, the pixel array 310a may include a plurality of sub-pixel groups each including at least two pixels among the plurality of pixels PX corresponding to the plurality of row lines. Each of the plurality of sub-pixel groups may include two pixels corresponding to each of row lines or two pixels corresponding to adjacent row lines among the plurality of row lines.

In FIG. 6, a first sub-pixel group 311a will be described as an example. Although FIG. 6 illustrates that the first sub-pixel group 311a includes pixels corresponding to a first row line ROW1, example embodiments are not limited thereto, and according to at least one example embodiment the first sub-pixel group 311a may include pixels respectively corresponding to adjacent row lines, e.g., the first row line ROW1 and the second row line ROW2.

The first sub-pixel group 311a may include a first pixel 313a and a second pixel 315a. The first pixel 313a and the second pixel 315a may have different saturation times. To this end, a light-shielding layer 20 and 21 may be formed on the first pixel 313a and the second pixel 315a, as illustrated in FIG. 7.

FIG. 7 is a cross-sectional view of a first sub-pixel group 311a when the image sensor 300 is a front-side illuminated (FSI) image sensor.

Referring to FIG. 7, in the first pixel 313a and the second pixel 315a belonging to the first sub-pixel group 311a, photodiodes PD1 and PD2 may be formed on a silicon substrate and color filters CF11 and CF12 may be formed on the photodiodes PD1 and PD2. Isolation material ISM may be formed between the photodiodes PD1 and PD2. A lens buffer or a planarization layer may be formed between micro-lenses 312a and 323a and the color filters CF11 and CF12. Micro-lenses 321a and 323a may be formed on the color filters CF11 and CF12, respectively.

The first pixel 313a may further include a light-shielding layer 20 between the color filter CF11 and the photodiode PD1. The second pixel 315a may further include a light-shielding layer 21 between the color filter CF12 and the photodiode PD2. Although FIG. 7 illustrates that the light-shielding layer 20 is formed at a lower left portion of the color filter CF11 and the light-shielding layer 21 may be formed at a lower right portion of the color filter CF12, the light-shielding layer 20 is formed at formed at a lower right or central portion of the color filter CF11 to have an area corresponding to approximately 50% of the area of the photodiode PD1 and the light-shielding layer 21 is formed at formed at a lower left or central portion of the color filter CF12 to have an area corresponding to approximately 50% of the area of the photodiode PD2. In some example embodiments, the light-shielding layer 20 and 21 may be formed of a metal layer.

The light-shielding layer 20 and the light-shielding layer 21 may be symmetric to each other with respect to a boundary at which the first pixel 313a and the second pixel 315 are adjacent to each other. That is, light-shielding layer 20 and the light-shielding layer 21 may be symmetric to each other with respect to a boundary between the first pixel 313a and the second pixel 315a.

The ADC block 330 may convert pixel signals output from the first sub-pixel group 311a to digital pixel signals and may output the pixel signals to an image processor.

Figure 8:
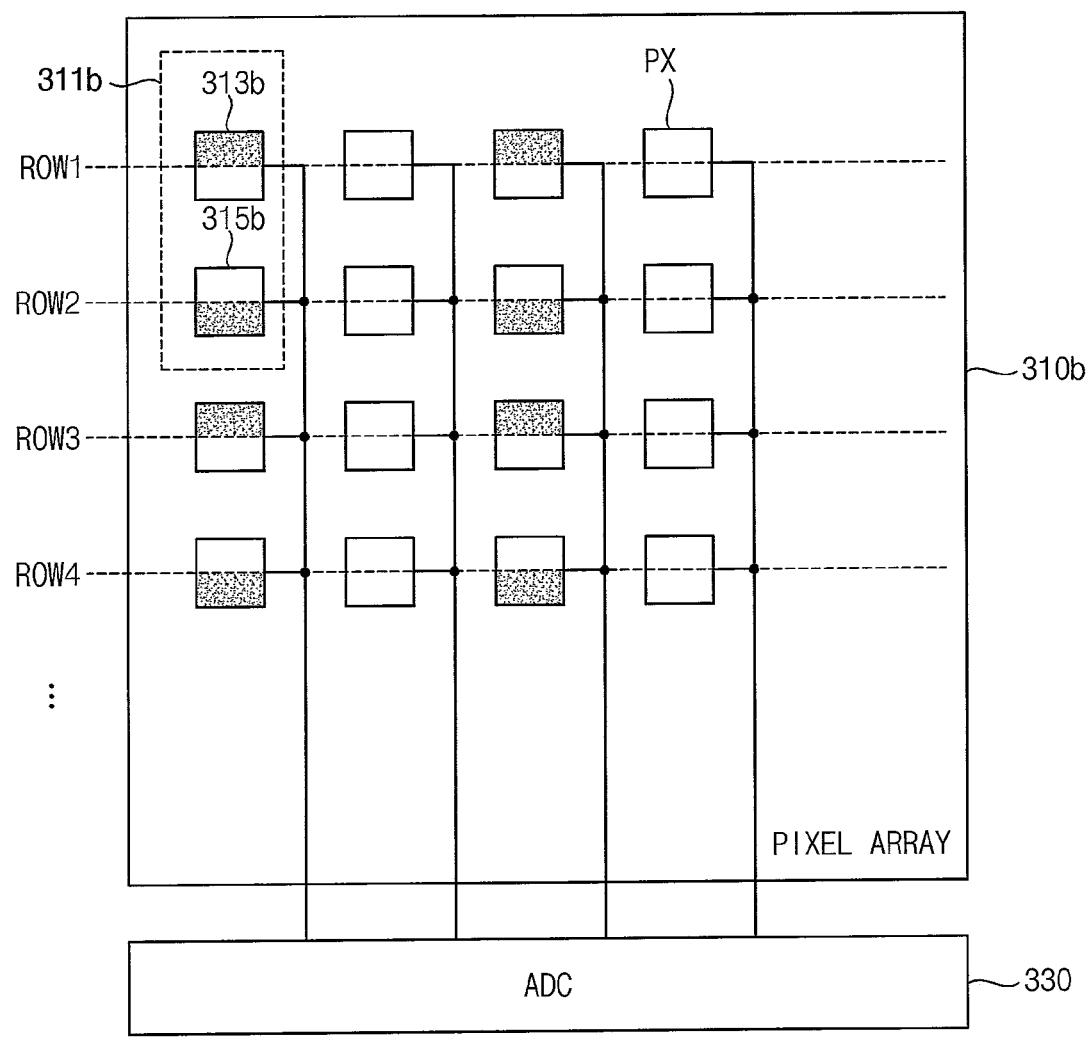
FIG. 8 is a block diagram illustrating another example of the pixel array in the display device of FIG. 4 according to example embodiments.

FIG. 8 is a block diagram illustrating another example of the pixel array in the display device of FIG. 4 according to example embodiments.

In FIG. 8, a first sub-pixel group 311b will be described as an example.

The first sub-pixel group 311b may include a first pixel 313b and a second pixel 315b. The first pixel 313b and the second pixel 315b may have different saturation times.

To this end, a first light-shielding layer may be formed on the first pixel 313b and a second light-shielding layer may be formed on the second pixel 315b. A first region in which the first light-shielding layer is formed in the first pixel 313b and a second region in which the second light-shielding layer is formed in the second pixel 315b may not correspond to each other.

As described with reference to FIG. 7, in the first pixel 313b and the second pixel 315b belonging to the first sub-pixel group 311b, photodiodes may be formed on a silicon substrate, color filters may be formed on the photodiodes and micro-lenses may be formed on the color filters.

The first pixel 313b may further include a first light-shielding layer between the color filter and the photodiode. The second pixel 315b may further include a second light-shielding layer between the color filter and the photodiode. The first light-shielding layer is formed at an upper portion under the color filter and the second light-shielding layer may be formed at a lower portion under the color filter. In some example embodiments, the first light-shielding layer and the first light-shielding layer may be formed of a metal layer.

Figure 9:
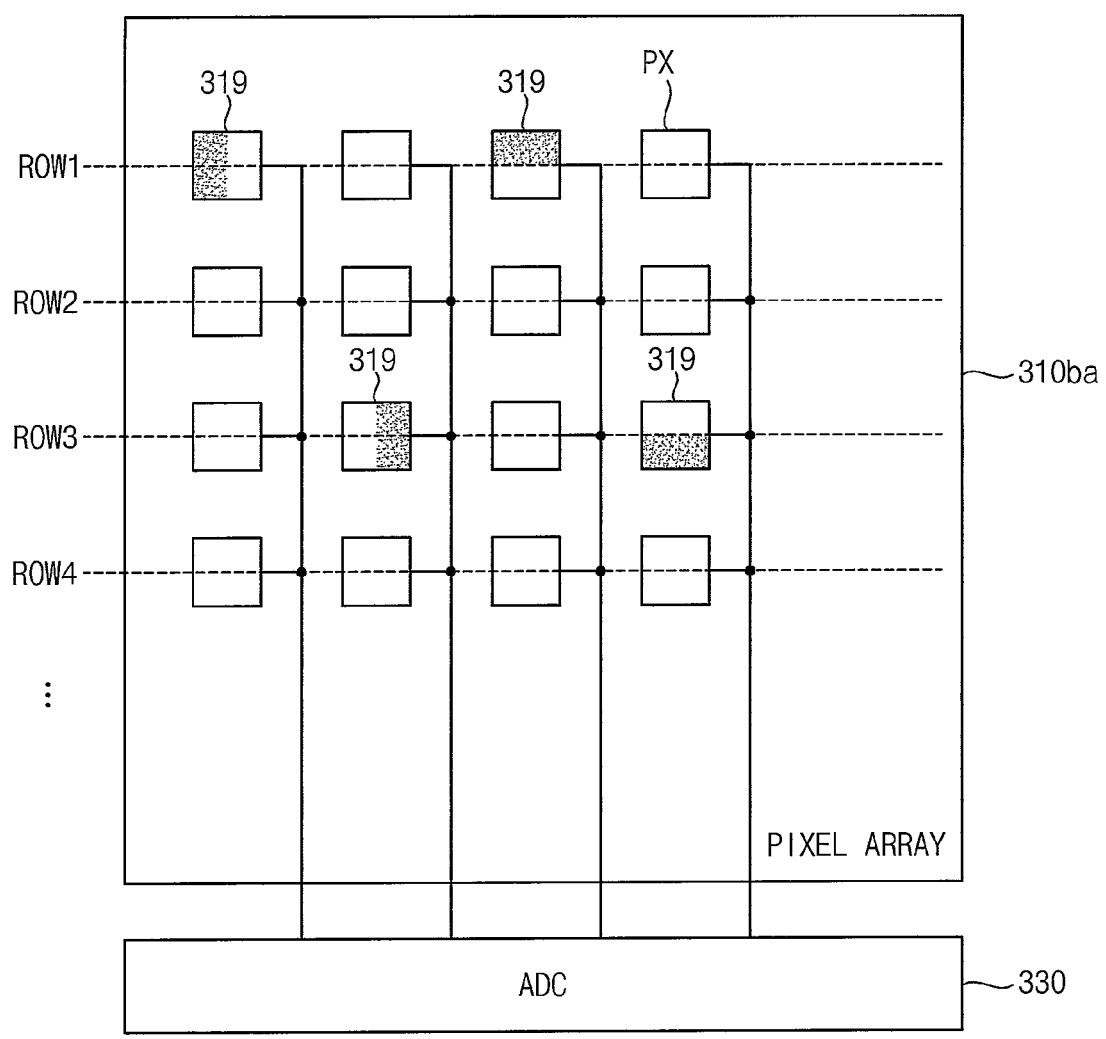
FIG. 9 is a block diagram illustrating another example of the pixel array in the display device of FIG. 4 according to example embodiments.

FIG. 9 is a block diagram illustrating another example of the pixel array in the display device of FIG. 4 according to example embodiments.

Referring to FIG. 9, a pixel array 310ba may include a plurality of pixels PX corresponding to a plurality of row lines ROW1, ROW2, ROW3, ROW4, etc. The plurality of pixels PX may respectively include a plurality of photodiodes. At least a portion of pixels PX may be used as phase detection pixels 319, each including a light-shielding layer and the phase detection pixels 319 may be randomly arranged in the pixel array 310ba.

As described with reference to FIGS. 6 through 9, at least some of the pixels in the pixel array 310a, 310b and 310ba include a light-shielding layer, and each of the at least some of the pixels that include the light-shielding layer and each of other pixels without light-shielding layer may have different saturation times.

FIG. 10 is a block diagram illustrating another example of the pixel array in the display device of FIG. 4 according to example embodiments.

A pixel array 310c may have an 8*8 (* denotes a multiplication operation) matrix structure. For example, each pixel PX may be a sub-pixel and be adjacent arranged in groups of four sub-pixels. However, example embodiments are not limited thereto, and the arrangement of the pixel array 310c and a color filter array may be variously changed or modified according to various example embodiments.

Referring to FIG. 10, the pixel array 310c may include a plurality of pixels PX11~PX22.

The pixel PX11 may include a first color filter (for example, a first green (Gb) color filter). For example, the pixel PX11 may convert green light into an electrical signal. The pixel PX12 may include a second color filter (for example, a blue (B) color filter). For example, the PX12 may convert blue light into an electrical signal.

The pixel PX21 may include a third color filter (for example, a red (R) color filter). For example, the pixel PX21 may convert red light into an electrical signal. The pixel PX22 may include a fourth color filter (for example, a second green (Gr) color filter). For example, pixel PX22 may convert green light into an electrical signal.

In example embodiments, the four pixels PX11, PX12, PX21, and PX22 may by sub-pixels corresponding to different colors, and may constitute a Bayer pattern.

Figure 11:
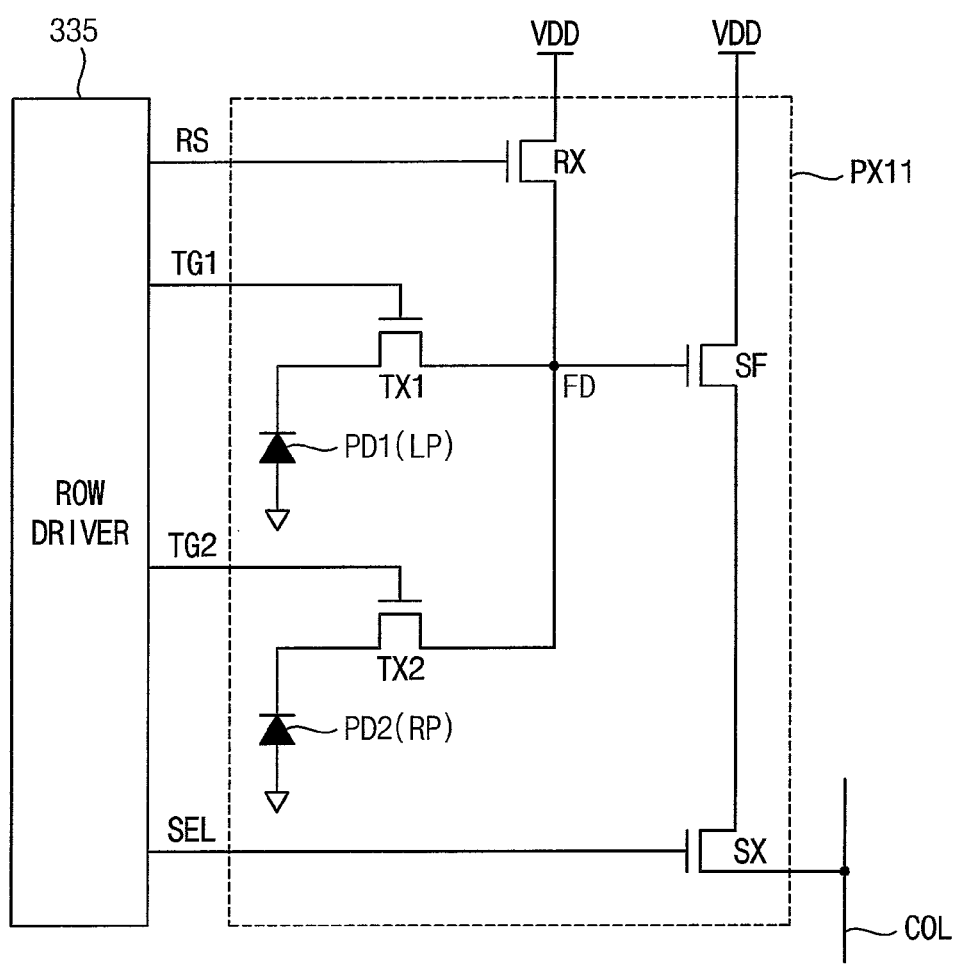
FIG. 11 is a diagram for describing one pixel illustrated in FIG. 10 according to example embodiments.

FIG. 11 is a diagram for describing one pixel illustrated in FIG. 10 according to example embodiments.

As shown in FIG. 11, a pixel may include a 5-transistors. However, example embodiments are not limited thereto and a pixel may be changed or modified to have various pixel structures that include additional or fewer transistors.

Referring to FIGS. 10 and 11, the pixel PX11 may include two photodiodes PD1 and PD2, two transfer transistors TX1 and TX2, a reset transistor RX, a source follower SF, and a selection transistor SX.

The first transfer transistor TX1 may have one end connected to a cathode of the first photodiode PD1, the other end thereof connected to a floating diffusion node FD, and a control electrode to receive a control signal TG1. The second transfer transistor TX2 may have one end connected to a cathode of the second photodiode PD2, the other end thereof connected to the floating diffusion node FD, and a control electrode to receive a control signal TG2.

One end of the reset transistor RX may be connected to receive a power supply voltage VDD, the other end thereof may be connected to the floating diffusion node FD, and a control electrode (i.e., gate) may be connected to receive a control signal RS. One end of the source follower SF may be connected to receive the power supply voltage VDD, the other end thereof may be connected to one end of the selection transistor SX, and a control electrode (i.e., gate) thereof may be connected to the floating diffusion node FD. One end of the selection transistor SX may be connected to receive the power supply voltage VDD, the other end thereof may be connected to the column line COL, and a control electrode (i.e., gate) thereof may be connected to receive a control signal SEL.

Each of control signals TG1, TG2, RS, and SEL, which can respectively control transistors TX1, TX2, RX, and SX, may be output from the row driver 335. An output signal of the selection transistor SX is supplied to the column line COL.

For convenience of description in FIG. 11, a pixel which has a shared floating diffusion node FD is shown. However, in other example embodiments, photodiodes PD1 and PD2 may not share a single floating diffusion node FD.

Figure 12:
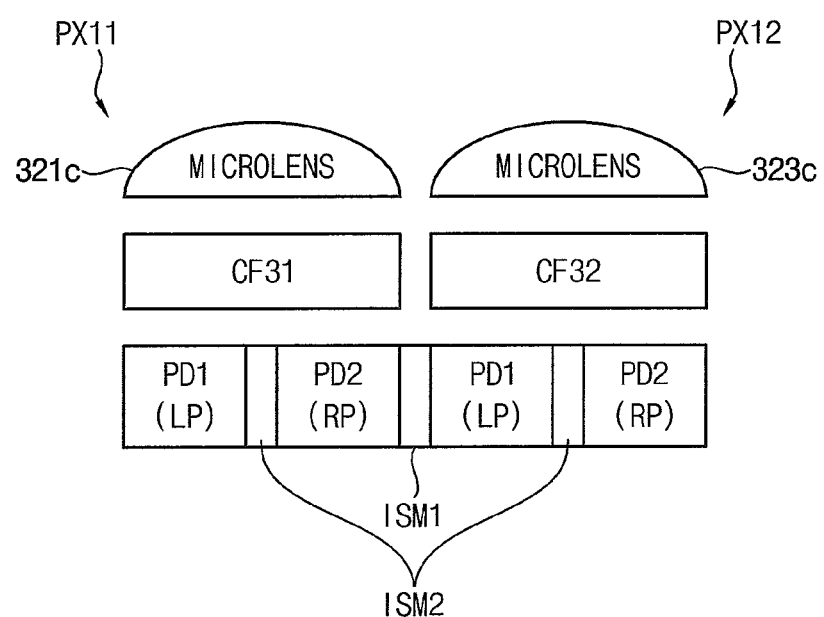
FIG. 12 is cross-sectional views of pixels including photodiodes taken along the line II-II' illustrated in the pixel array of FIG. 10 according to example embodiments.

FIG. 12 is cross-sectional views of pixels including photodiodes taken along the line II-II' illustrated in the pixel array of FIG. 10 according to example embodiments.

Referring to FIGS. 10 and 12, the first pixel PX11 may include first and second photodiodes PD1 (LP) and PD2 (RP), a first color filter CF31 placed on the first and second photodiodes PD1 and PD2 and a first micro-lens 321c placed on the first color filter CF31. The first color filter CF31 may be a green color filter.

The first pixel PX12 may include first and second photodiodes PD1 and PD2, a second color filter CF32 placed on the first and second photodiodes PD1 and PD2 and a second micro-lens 323c placed on the second color filter CF32. The second color filter CF32 may be a blue color filter.

A first isolation material ISM1 may be placed between the first pixel PX11 and the second pixel PX12. A second isolation material ISM2 may be placed between two photodiodes PD1 and PD2 in each of the pixels PX11 and PX12. The first and second isolation materials ISM1 and ISM2 may be formed using deep trench isolation (DTI).

As described with reference to FIGS. 10 through 12, each of the pixels in the pixel array 310c includes two photodiodes and the pixel array 310c may generate disparity data associated with difference of data generated by the first photodiode and the second photodiode. The disparity data may include depth information. Therefore, the pixel array 310c may generate a fingerprint image signal and a fingerprint phase signal.

Figure 13:
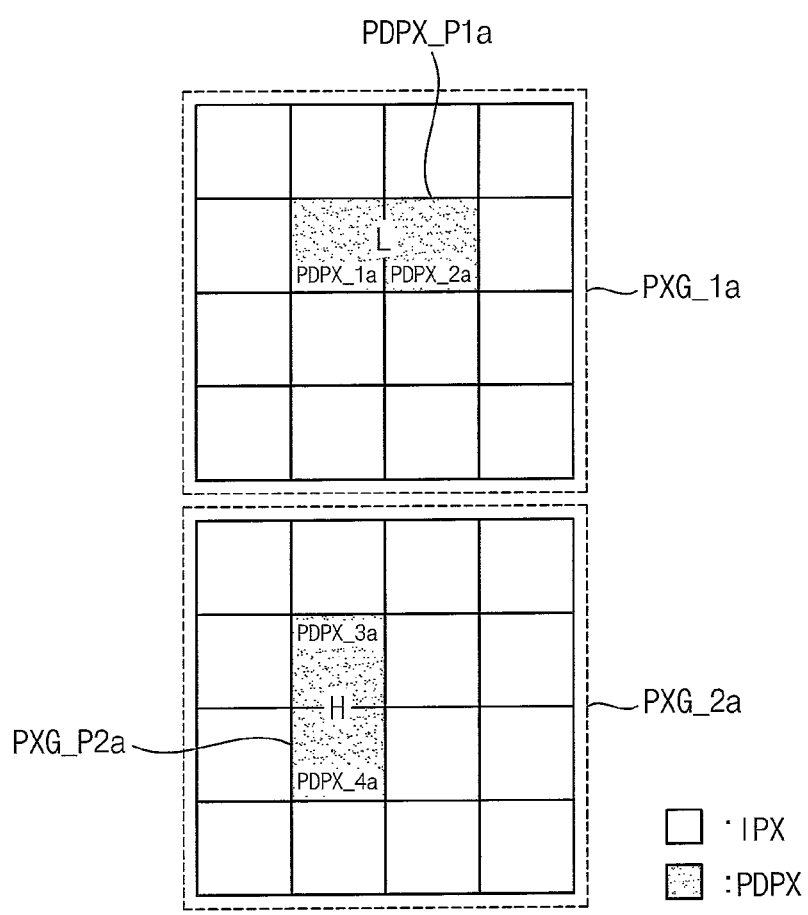
FIG. 13 is a diagram illustrating a partial configuration of an example of the pixel array in FIG. 4 according to example embodiments.

FIG. 13 is a diagram illustrating a partial configuration of an example of the pixel array in FIG. 4 according to example embodiments.

Referring to FIG. 13, a pixel array 310d may include a first pixel group PXG_1a and a second pixel group PXG_2a. Hereinafter, it is described for convenience that a pixel group is a unit including a plurality of image pixels IPX and one phase detection pixel pair PDPX. However, example embodiments are not limited thereto and additional phase detection pixel pairs may be present. The plurality of image pixels IPX may generate the fingerprint image signal FIS and the phase detection pixel PDPX pair may generate the fingerprint phase signal FPS.

The second pixel group PXG_2a may be arranged adjacent to the first pixel group PXG_1a in a downward direction. The first pixel group PXG_1a may include the plurality of image pixels IPXs and a first phase detection pixel pair PDPX_P1a, and the second pixel group PXG_2a may include the plurality of image pixels IPXs and a second phase detection pixel pair PDPX_P2a.

The first phase detection pixel pair PDPX_P1a may include first phase detection pixels PDPX_1a and PDPX_2a, and the second phase detection pixel pair PDPX_P2a may include second phase detection pixels PDPX_3a and PDPX_4a. In some example embodiments, the first phase detection pixels PDPX_1a and PDPX_2a in the first phase detection pixel pair PDPX_P1a may be arranged adjacent to each other in the horizontal direction, and the second phase detection pixels PDPX_3a and PDPX_4a in the second phase detection pixel pair PDPX_P2a may be arranged adjacent to each other in the vertical direction. In addition, the sensitivity of the first phase detection pixel pair PDPX_P1a may be different from the sensitivity of the second phase detection pixel pair PDPX_P2a.

A configuration of the first pixel group PXG_1a and the second pixel group PXG_2a illustrated in FIG. 13 is not limited thereto, and the first pixel group PXG_1a and the second pixel group PXG_2a may include more or less image pixels IPXs and arrangements of the first phase detection pixel pair PDPX_P1a and the second phase detection pixel pair PDPX_P2a may be variously implemented.

Figure 14:
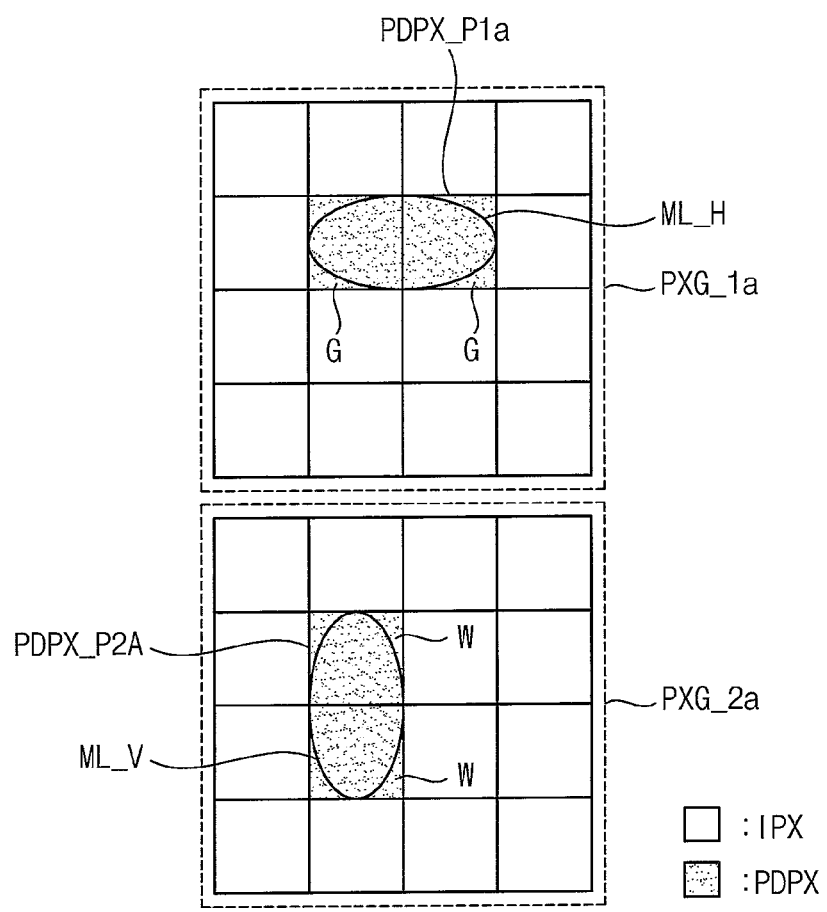
FIG. 14 is a diagram illustrating a specific configuration of the first phase detection pixel pair and the second phase detection pixel pair according to example embodiments.
Figure 15:
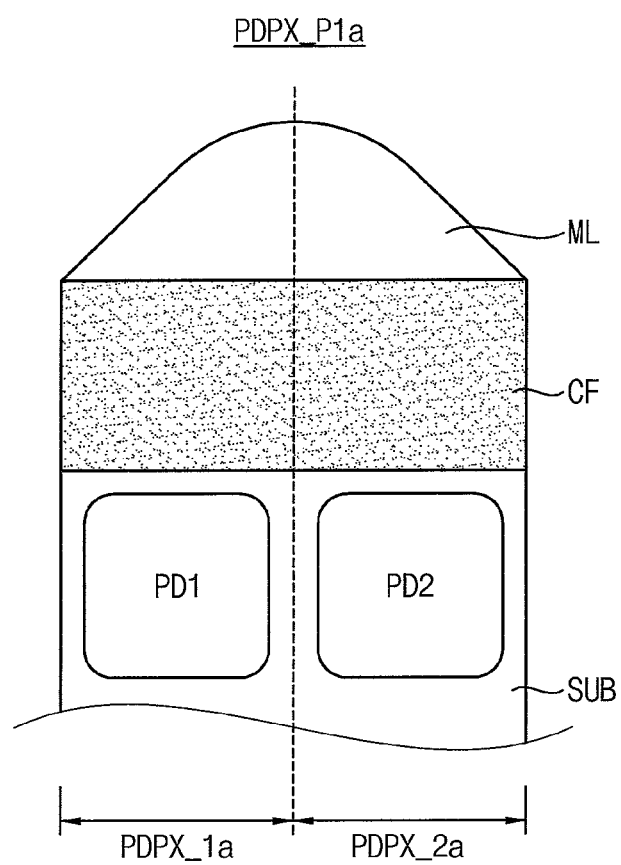
FIG. 15 is a diagram illustrating a specific configuration of the first phase detection pixel pair.

FIG. 14 is a diagram illustrating a specific configuration of the first phase detection pixel pair and the second phase detection pixel pair according to example embodiments, and FIG. 15 is a diagram illustrating a specific configuration of the first phase detection pixel pair.

Referring to FIG. 14, a type of the color filter included in the first phase detection pixels of the first phase detection pixel pair PDPX_P1a and a type of the color filter included in the second phase detection pixels of the second phase detection pixel pair PDPX_P2a may be different from each other, so that the sensitivity of the first phase detection pixel pair PDPX_P1a is different from the sensitivity of the second phase detection pixel pair PDPX_P2a. For example, the first phase detection pixels of the first phase detection pixel pair PDPX_P1a may each include a green color filter, and the second phase detection pixels of the second phase detection pixel pair PDPX_P2a may each include a white color filter (or may not include any color filter). In addition, the first phase detection pixel pair PDPX_P1a may be covered with one horizontal micro-lens ML_H, and the second phase detection pixel pair PDPX_P2a may be covered with one vertical micro-lens ML_V.

Referring further to FIG. 15, the first phase detection pixel pair PDPX_P1a may include the first phase detection pixels PDPX_1a and PDPX_2a. A first photodiode PD1 of the first phase detection pixel PDPX_1a and a second photodiode PD2 of the first phase detection pixel PDPX_2a may be arranged in a substrate SUB. A color filter CF (for example, a green color filter) may be arranged on the substrate SUB. In addition, one micro-lens ML may be arranged over the first phase detection pixel pair PDPX_P1a. A structure of or similar to the first phase detection pixel pair PDPX_P1a illustrated in FIG. 15 may also be applied to the second phase detection pixel pair PDPX_P2a. However, the type of the color filter included in the second phase detection pixel pair PDPX_P2a may be different from the type of the color filter included in the first phase detection pixel pair PDPX_P1a.

Figure 16:
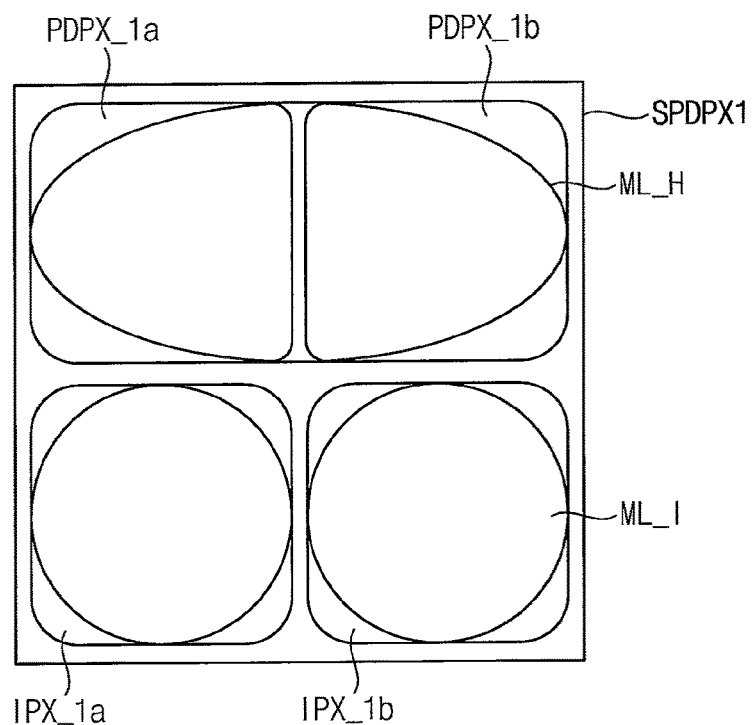
FIGS. 16 and 17 are diagrams illustrating shared phase detection pixels respectively, according to example embodiments.
Figure 17:
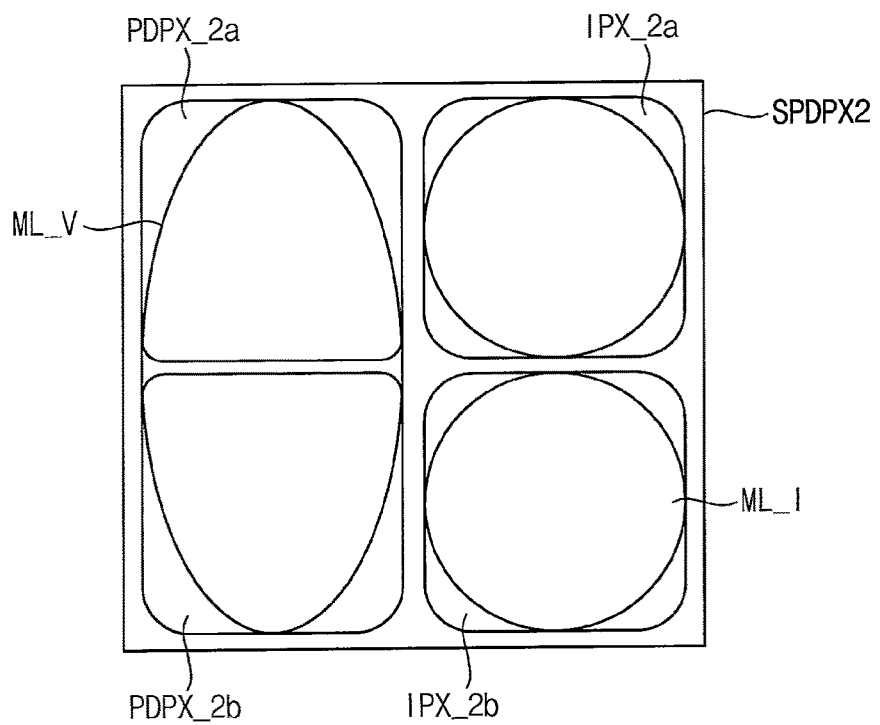

FIGS. 16 and 17 are diagrams illustrating shared phase detection pixels respectively, according to example embodiments.

Referring to FIG. 16, a first shared phase detection pixel SPDPX1 may include first phase detection subpixels PDPX_1a and PDPX_1b, and first image (sensing) subpixels IPX_1a and IPX_1b. The first phase detection subpixels PDPX_1a and PDPX_1b may be defined as a first phase detection subpixel pair. The first phase detection subpixels PDPX_1a and PDPX_1b may be arranged adjacent to each other in the horizontal direction and may be covered with one horizontal micro-lens ML_H. In addition, each of the first image subpixels IPX_1a and IPX_1b may be individually covered with an individual micro-lens ML_I.

In some example embodiments, the types of color filters included in the first phase detection subpixels PDPX_1a and PDPX_1b and the types of color filters included in the first image sensing subpixels IPX_1a and IPX_1b may be identical to or different from each other. A structure of the first phase detection subpixels PDPX_1a and PDPX_1b may be the same as the structure of the first and second phase detection pixels PDPX_1a and PDPX_2a illustrated in FIGS. 14 and 15, and thus, a detailed description thereof is omitted.

Referring further to FIG. 17, the second shared phase detection pixel SPDPX2 may include second phase detection subpixels PDPX_2a and PDPX_2b, and second image subpixels IPX 2a and IPX 2b. The second phase detection subpixels PDPX_2a and PDPX_2b may be defined as a second phase detection subpixel pair. The second phase detection subpixels PDPX_2a and PDPX_2b may be arranged adjacent to each other in the vertical direction and may be covered with one vertical micro-lens ML_H. In addition, each of the second image subpixels IPX 2a and IPX 2b may be individually covered with the individual micro-lens ML_I.

In some example embodiments, the types of color filters included in the second phase detection subpixels PDPX_2a and PDPX_2b and the types of color filters included in the second image subpixels IPX 2a and IPX 2b may be identical to or different from each other. In addition, the sensitivity of the first phase detection subpixels PDPX_1a and PDPX_1b of the first shared phase detection pixel SPDPX1 and the sensitivity of the second phase detection subpixels PDPX_2a and PDPX_2b of the second phase detection shared pixel SPDPX2 may be different from each other, and furthermore, the sensitivity of the first phase detection subpixels PDPX_1a and PDPX_1b may be less than the sensitivity of the second phase detection subpixels PDPX_2a and PDPX_2b.

In other words, the type of the color filter included in the first phase detection subpixels PDPX_1a and PDPX_1b may be different from the type of the color filter included in the second phase detection subpixels PDPX_2a and PDPX_2b. A structure of the second phase detection subpixels PDPX_2a and PDPX_2b may be the same as or similar to the structure of the first phase detection pixels PDPX_1a and PDPX_2a described above with reference to FIGS. 14 and 15, and thus, a detailed description thereof is omitted.

As described with reference to FIGS. 13 through 17, the plurality of pixels in the pixel array 310d may be divided into a plurality of pixel groups, each of the pixel groups includes a phase detection pixel pair and pixel array 310d may generate the fingerprint image signal FIS and the fingerprint phase signal FPS. The image (sub) pixels generate the fingerprint image signal FIS and the phase detection pixel pairs of the phase detection subpixels generate the fingerprint phase signal FPS.

Figure 18:
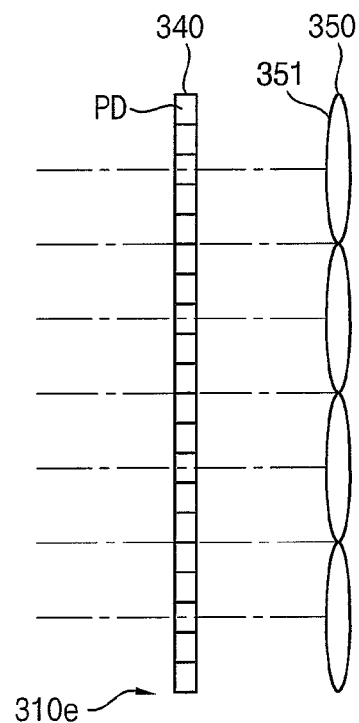
FIG. 18 is a block diagram illustrating another example of the pixel array in the display device of FIG. 4 according to example embodiments.

FIG. 18 is a block diagram illustrating another example of the pixel array in the display device of FIG. 4 according to example embodiments.

Referring to FIG. 18, a pixel array 310e may include a photodiode array 340 having a plurality of two-dimensionally (2D) arranged photodiodes PDs and a micro-lens array 350 having a plurality of two-dimensionally arranged micro-lenses 351.

The photodiode array 340 may include plurality of two-dimensionally arranged photodiodes PDs. The micro-lens array 350 may be arranged to face the photodiode array 340 in parallel thereto and may include the plurality of two-dimensionally arranged micro-lenses 351. As shown in FIG. 18, the photodiodes PDs may have smaller diameters than the micro-lenses 351 and may be arranged with respect to the single micro-lens 351. Although FIG. 18 illustrates a row of five photodiodes PDs corresponding to each one of the micro-lenses 351, this is merely an example. According to example embodiments, a greater or smaller number of photodiodes PDs may be arranged to correspond with each single micro-lens 351.

A set of the plurality of photodiodes PDs that are arranged to face a single micro lens 351 is referred to as a 'photodiode block' below. The photodiode array 340 may include a plurality of photodiode blocks. For example, the photodiode array 340 may include a number of photodiode blocks equal to the number of micro-lenses 351. Thus, the photodiode blocks may respectively correspond to the plurality of micro-lenses 351. The plurality of photodiode PD may be two dimensionally arranged within each of the light photodiode blocks.

Figure 19:
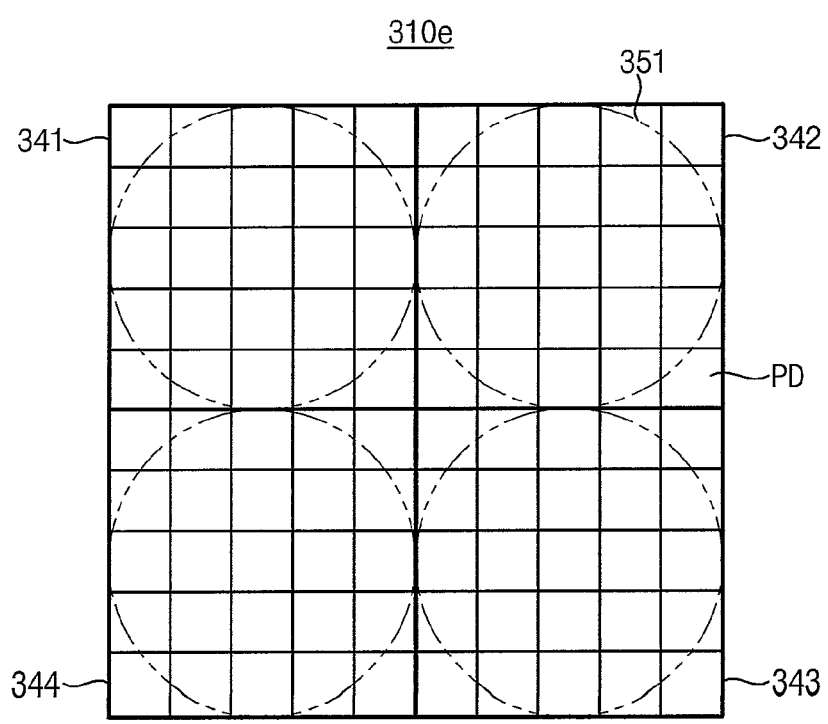
FIG. 19 is a plan view of the pixel array in FIG. 18 according to example embodiments.

FIG. 19 is a plan view of the pixel array in FIG. 18 according to example embodiments.

Referring to FIG. 19, a plurality of photodiode blocks 341, 342, 343 and 344 may be two-dimensionally arranged in the plurality of micro-lenses 121 respectively, and a plurality of photodiode PD may be two-dimensionally arranged in each of the light source blocks 110a, 100b, 110c, and 110d. Although the micro lenses 121 and the photodiode blocks 341, 342, 343 and 344 are arranged in a 2*2 arrangement in FIG. 19, a much greater number of micro-lenses 351 and photodiode blocks may be actually arranged. Although the photodiodes PDs are arranged in a 5*5 arrangement in each of the photodiode blocks 341, 342, 343 and 344 in FIG. 19, this is merely an example. The number of photodiodes PDs arranged in each of the photodiode blocks 341, 342, 343 and 344 may vary depending on diameters of the micro-lenses 351 and the photodiodes PDs and may be selected in accordance with the number of viewpoints that are to be implemented. The photodiodes PDs are arranged in an n*n arrangement in each of the photodiode blocks 341, 342, 343 and 344, and n is an integer greater than one.

Figure 20:
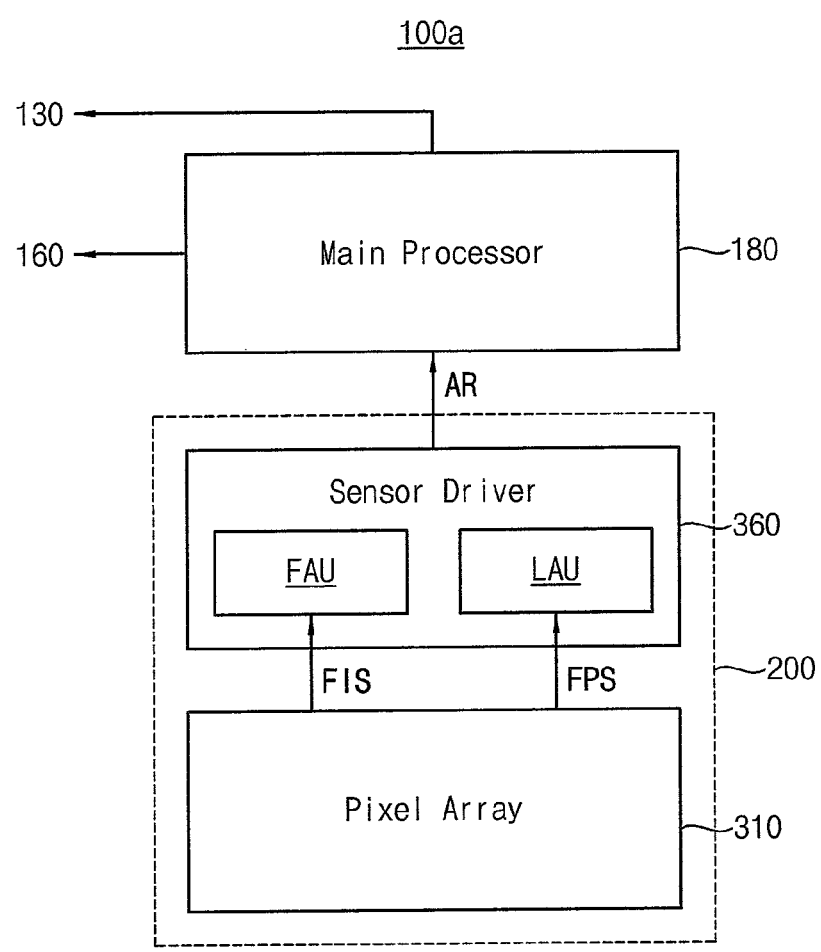
FIG. 20 is a block diagram illustrating an example of the display device of FIG. 1 according to example embodiments.

FIG. 20 is a block diagram illustrating an example of the display device of FIG. 1 according to example embodiments.

In FIG. 20, for brevity of illustration and for convenience of description, components except the main processor 180 and the fingerprint recognition sensor 200 are not illustrated.

Referring to FIG. 20, a display device 100a may include the main processor 180 and the fingerprint recognition sensor 200, and the pixel array 310 and a sensor driver 360 may be provided in the fingerprint recognition sensor 200. The sensor driver 360 may include a fingerprint authentication unit FAU and a liveness authentication unit LAU.

The pixel array 310 includes a plurality of pixels, generates the fingerprint image signal FIS and the fingerprint phase signal FPS in response to an object that is touching or proximate the pixel array 310 by using at least some of the pixels as phase detection pixels, and provides the fingerprint image signal FIS and the fingerprint phase signal FPS to the sensor driver 360.

The fingerprint authentication unit FAU may receive the fingerprint image signal FIS and may perform a fingerprint matching operation based on the fingerprint image signal FIS. For example, the fingerprint authentication unit FAU performs the fingerprint matching operation by comparing the fingerprint image signal FIS and a preset fingerprint image information. The preset fingerprint image information may be information that is registered in advance by a user through a separate registration process.

The liveness authentication unit LAU may perform a liveness detection operation based on the fingerprint image signal FIS. For example, if the fingerprint image signal FIS is provided by a human, the fingerprint image signal FIS may include phase information and/or depth information on a fingerprint. The liveness authentication unit LAU may perform the liveness detection operation to determine whether the fingerprint is counterfeited based on comparing the phase information and/or depth information with a preset fingerprint phase information. The liveness detection operation may correspond to anti-spoofing operation.

In example embodiments, whether a fingerprint is a fingerprint of a real person or a fake fingerprint (e.g., an image of a fingerprint on a printed photo, an imprint of a fingerprint on moldable clay) may be determined through the liveness detection operation.

As described above, the sensor driver 360 may transmit an authentication result AR to the main processor 180 depending on the operation results of the fingerprint authentication unit FAU and the liveness authentication unit LAU. That is, the sensor driver 360 may automatically perform the fingerprint matching operation and the liveness detection operation. In the case where authentication is successfully made in both the fingerprint authentication unit FAU and the liveness authentication unit LAU, the authentication result AR may include information about authentication success. In contrast, in the case where authentication fails in any one or all of the fingerprint authentication unit FAU and the liveness authentication unit LAU, the authentication result AR may include information about authentication fail.

Figure 21:
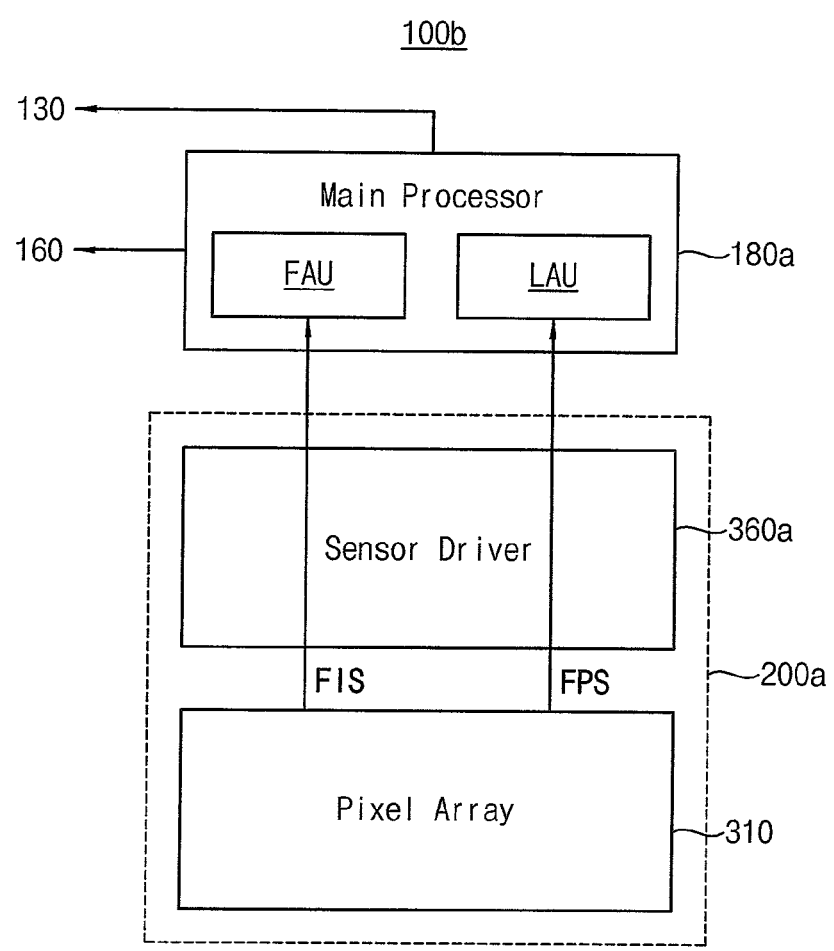
FIG. 21 is a block diagram illustrating another example of the display device of FIG. 1 according to example embodiments.

FIG. 21 is a block diagram illustrating another example of the display device of FIG. 1 according to example embodiments.

Referring to FIG. 21, a display device 100b may include a main processor 180a and the fingerprint recognition sensor 200a and the fingerprint recognition sensor 200a may include the pixel array 310 and a sensor driver 360. The main processor 180a may include a fingerprint authentication unit FAU and a liveness authentication unit LAU.

In contrast to the display device 100a of FIG. 20, in the display device 100b of FIG. 21, the fingerprint authentication unit FAU and the liveness authentication unit LAU may be included in the main processor 180a. That is, the main processor 180a may directly receive the fingerprint image signal FIS and the fingerprint phase signal FPS from the pixel array 310. The fingerprint authentication unit FAU and the liveness authentication unit LAU included in the main processor 180a may perform the fingerprint matching operation and the liveness detection operation, based on the fingerprint image signal FIS and the fingerprint phase signal FPS.

Figure 22:
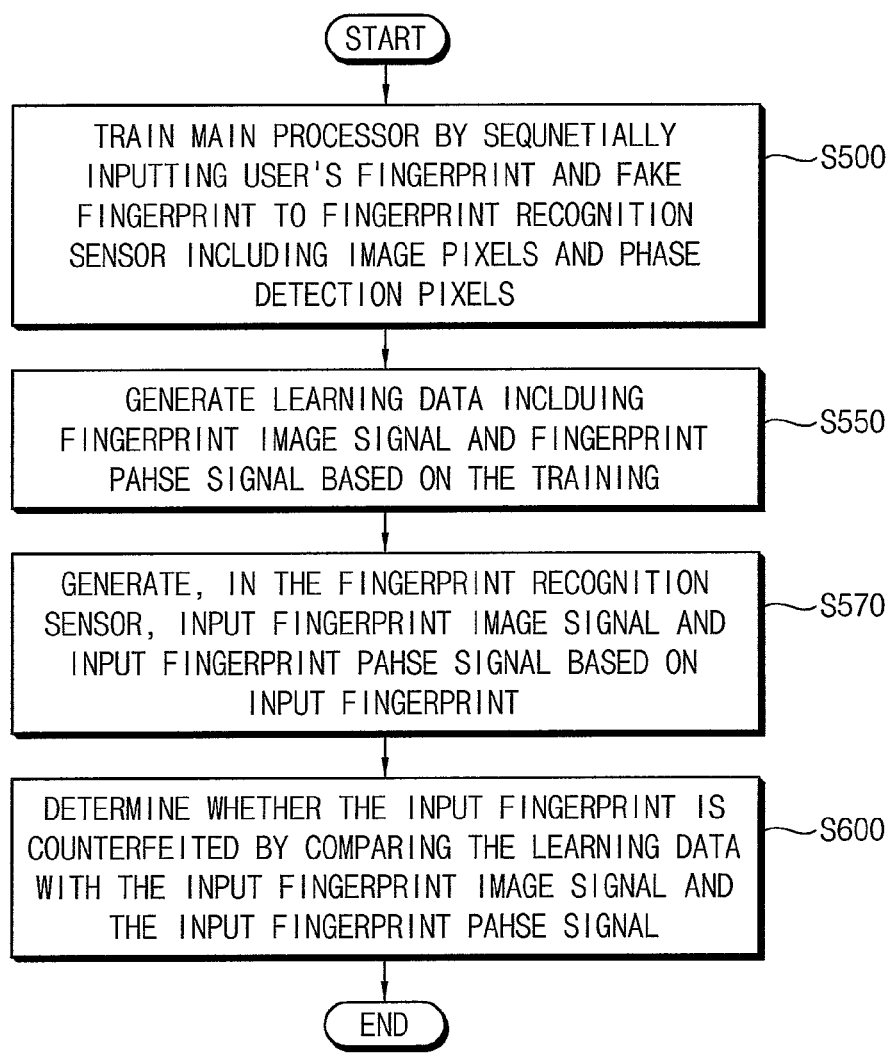
FIG. 22 is a flowchart illustrating a method of anti-spoofing in a display device including a fingerprint recognition sensor having a pixel array according to example embodiments.
Figure 23:
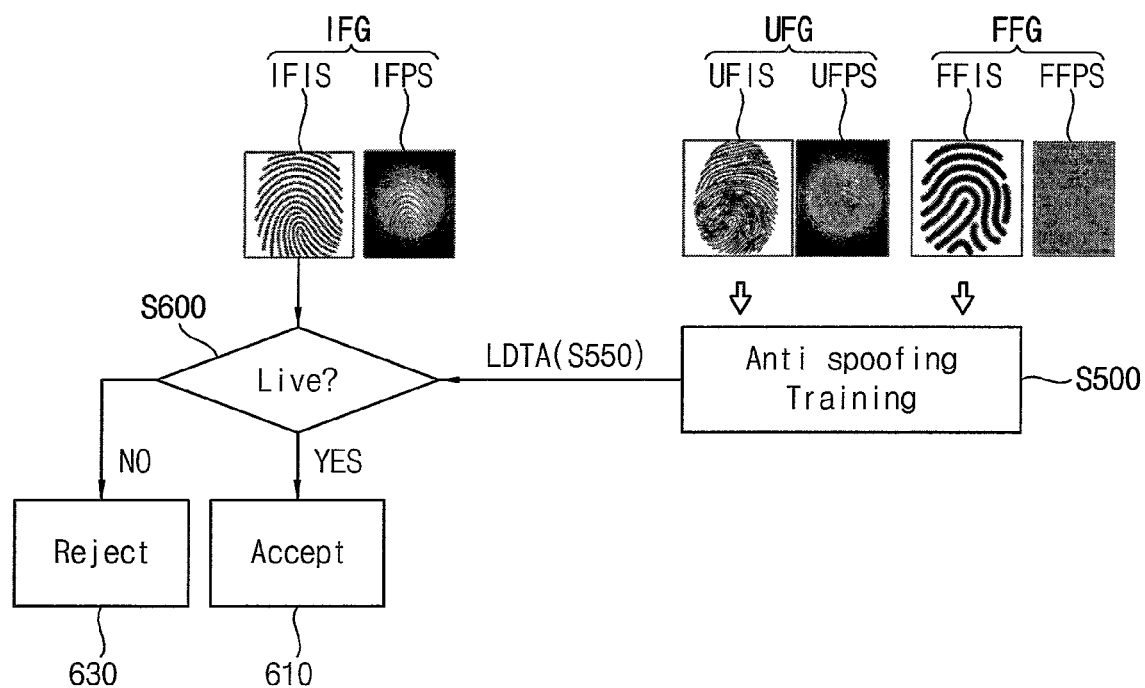
FIG. 23 is a diagram for explaining the method of FIG. 22.

FIG. 22 is a flowchart illustrating a method of anti-spoofing in a display device including a fingerprint recognition sensor having a pixel array according to example embodiments and FIG. 23 is a diagram for explaining the method of FIG. 22.

Referring to FIGS. 1 through 23, the main processor 180 to control the fingerprint recognition sensor 200 is trained by sequentially inputting a user's fingerprint UFG and a fake fingerprint FFG to the fingerprint recognition sensor 200 including a plurality of pixels (operation S500). The fingerprint recognition sensor 200 may output a fingerprint image signal UFIS and a fingerprint phase signal UFPS to the main processor 180 in response to the user's fingerprint UFG. The fingerprint recognition sensor 200 may output a fingerprint image signal FFIS and a fingerprint phase signal FFPS to the main processor 180 in response to the fake fingerprint FFG.

The ANN 190 in the main processor 180 performs a machine learning based on the fingerprint image signal UFIS, the fingerprint image signal UFPS, the fingerprint image signal FFIS and the fingerprint image signal FFPS (operation S500). The main processor 180 generates a learning data LDTA based on the training (operation S550) and stores the learning data LDTA in the memory 195. The learning data LDTA may include phase information and/or image information to be used for determining the fake fingerprint FFG.

When an input fingerprint IFG contacts and/or approaches the fingerprint recognition window FRW, the fingerprint recognition sensor 200 may perform an anti-spoofing operation to determine whether the input fingerprint IFG is counterfeited (operation S600) and/or fingerprint authentication operation to determine whether the input fingerprint IFG matches the user's fingerprint UFG based on comparing an input fingerprint image signal IFIS and an input fingerprint phase signal IFPS with the learning data LDTA stored in the memory 195.

According to the anti-spoofing operation (operation S600), the main processor 180 may determine whether the input fingerprint IFG has a liveness by perform a liveness detection operation on the input fingerprint IFG. If the input fingerprint IFG has a liveness (YES in operation S600), the main processor 180 accepts the input fingerprint IFG (operation S630). If the input fingerprint IFG does not have a liveness (NO in operation S600), the main processor 180 rejects the input fingerprint IFG (operation S650).

Figure 24:
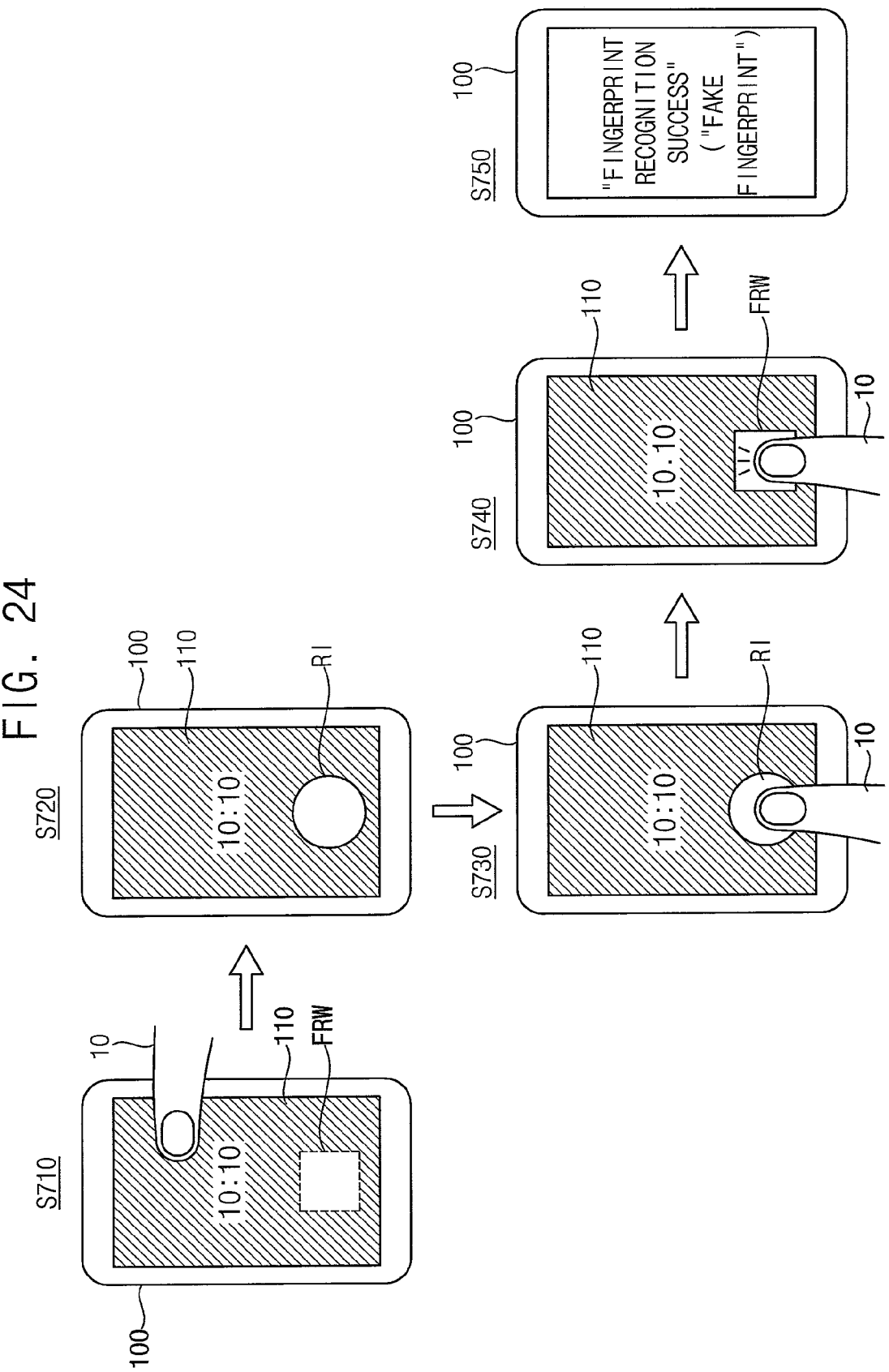
FIG. 24 is a diagram illustrating an example process for a method of anti-spoofing in a display device according to example embodiments.

FIG. 24 is a diagram illustrating an example process for a method of anti-spoofing in a display device according to example embodiments.

Referring to FIG. 24, after storing the learning data, the fingerprint recognition mode may be entered (operation S710) based on a predetermined request. For example, the request may occur in response to contact or proximity of the object 10 on or to any area on the panel 110. For example, the request may occur while the panel 110 is in a stand-by mode (e.g., while the panel 110 displays the reduced or the minimal amount of information such as a current time).

For example, the user may not know a location at which the fingerprint recognition sensor 200 is disposed. Thus, in some cases, the user may contact or approach a region other than the fingerprint recognition window FRW through the object 10. The display device 100 may determine that a touched area does not coincide with the fingerprint recognition window FRW, and may display a reference image RI by partially driving the panel 110 under control of the display driver 160 (operation S720). The reference image RI may be displayed to inform the user of the location at which the fingerprint recognition sensor 200 is disposed. The reference image RI may be displayed on some or all portions of the fingerprint recognition window FRW.

After that, the user may contact or approach, through the object 10, the fingerprint recognition window FRW in which the reference image RI is displayed (operation S730).

The display device 100 may determine that a touched area coincides with the fingerprint recognition window FRW, and may emit light by partially driving the panel 110 under control of the display driver 160 (operation S740).

The display device 100 may recognize the fingerprint based on reflected light of the fingerprint received through the fingerprint recognition window FRW. The display device 100 may determine whether the fingerprint recognized in the fingerprint recognition mode is counterfeited and whether the fingerprint corresponds to the fingerprint of the authenticated user (operation S750).

In some example embodiments, the reference image RI may be provided in association with a function of fingerprint detection. For example, because the function of fingerprint detection is associated with an issue of user authentication and security, the function of fingerprint detection may be processed with the highest priority.

In some example embodiments, the display device 100 may suitably drive the panel 110 under control of the display driver 160, such that an interface (e.g., the contact or proximity of the object 10) associated with the reference image RI is processed prior to an interface (e.g., a time setting) associated with the stand-by mode. In some cases, the user may contact or approach an area other than the fingerprint recognition window FRW again, even if the reference image RI is displayed. In this case, the display device 100 may display an error response to inform the user that a touched area does not coincide with the fingerprint recognition window FRW.

Figure 25:
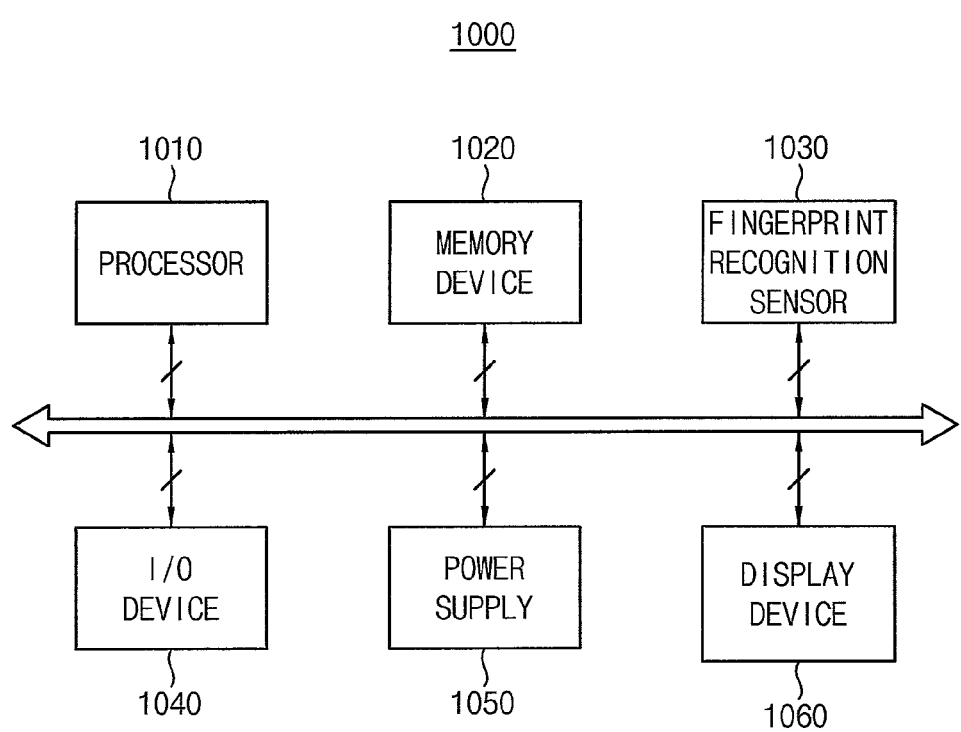
FIG. 25 is a block diagram illustrating an electronic device according to example embodiments.

FIG. 25 is a block diagram illustrating an electronic device according to example embodiments.

Referring to FIG. 25, an electronic device 1000 may include a processor 1010, a memory device 1020, a fingerprint recognition sensor 1030, an input/output (I/O) device 1040, a power supply 1050 and a display device 1060. The electronic device 100 may further include a plurality of ports for communicating a video card, a sound card, a memory card, a universal serial bus (USB) device, other electronic devices, etc.

The processor 1010 controls operations of the electronic device 1000. The processor 1010 may execute an operating system and at least one application to provide an internet browser, games, videos, or the like. The memory device 1020 may store data for operations of the electronic device 1000. The I/O device 1040 may include an input device such as a keyboard, a keypad, a mouse, a touchpad, a touchscreen, a remote controller, etc., and an output device such as a printer, a speaker, etc. The power supply 1050 may provide a power for operations of the electronic device 1000.

The display device 1060 includes a display panel. The display panel, the fingerprint recognition sensor 1030, the processor 1010 and the memory device 1020 in FIG. 27 may correspond to the display panel 150, the fingerprint recognition sensor 200, the main processor 180 and the memory 195 in FIG. 4, respectively, and may perform the anti-spoofing operation and the fingerprint authentication operation according to example embodiments.

Example embodiments may be applied to various electronic devices and systems that include the display panels and the fingerprint recognition sensors and perform the optical fingerprint recognition. For example, one or more example embodiments may be applied to systems such as a mobile phone, a smart phone, a tablet computer, a laptop computer, a personal digital assistant (PDA), a portable multimedia player (PMP), a digital camera, a portable game console, a music player, a camcorder, a video player, a navigation device, a wearable device, an internet of things (IoT) device, an internet of everything (IoE) device, an e-book reader, a virtual reality (VR) device, an augmented reality (AR) device, a robotic device, etc.

The foregoing is illustrative of example embodiments and is not to be construed as limiting thereof. Although some example embodiments have been described, those skilled in the art will readily appreciate that many modifications are possible without materially departing from the novel teachings and advantages of the example embodiments. Accordingly, all such modifications are intended to be included within the scope of the example embodiments as defined in the claims. Therefore, it is to be understood that the foregoing is illustrative of various example embodiments and is not to be construed as limited to the specific example embodiments disclosed, and that modifications to the disclosed example embodiments, as well as other example embodiments, are intended to be included within the scope of the appended claims.

What is claimed is:

1. A display device comprising:
a display panel comprising a plurality of display pixels;
a fingerprint recognition sensor comprising an image sensor disposed under a first surface of the display panel at a location corresponding to a fingerprint recognition window of the display panel; and
a main processor configured to control the display panel and the fingerprint recognition sensor,
wherein a portion of display pixels among the plurality of display pixels are configured to emit light in a fingerprint recognition mode, the portion of display pixels corresponding to the fingerprint recognition window,
wherein the image sensor comprises a pixel array with a plurality of pixels, at least a portion of the plurality of pixels comprises phase detection pixels, and the image sensor is configured to generate a fingerprint image signal and a fingerprint phase signal based on reflected light of a fingerprint received through the fingerprint recognition window while the portion of display pixels emit light, and
wherein the main processor is further configured to perform any one or any combination of an anti-spoofing operation and a fingerprint authentication operation based on the fingerprint image signal and the fingerprint phase signal, the anti-spoofing operation being associated with determining whether the fingerprint is counterfeited.

2. The display device of claim 1, wherein the main processor is further configured to:
perform a training based on a first fingerprint image signal and a first fingerprint phase signal generated by the image sensor according to a user fingerprint, and based on a second fingerprint image signal and a second fingerprint phase signal generated by the image sensor according to a fake fingerprint;
generate learning data based on a result of the training; and
perform the anti-spoofing operation by comparing the fingerprint image signal and the fingerprint phase signal corresponding to the fingerprint with the learning data.

3. The display device of claim 2, wherein the main processor comprises an artificial neural network engine, and
wherein the artificial neural network engine is configured to generate the learning data by performing machine learning based on the first fingerprint image signal, the first fingerprint phase signal, the second fingerprint image signal and the second fingerprint phase signal.

4. The display device of claim 2, wherein the main processor is further configured to perform the anti-spoofing operation based on a change of the first fingerprint image signal and the first fingerprint phase signal which are generated by the image sensor during a reference time interval.

5. The display device of claim 1, wherein each of the plurality of pixels comprises:
a photoelectric conversion element disposed on a substrate;
a color filter disposed on the photoelectric conversion element; and
a micro-lens disposed on the color filter, and
wherein each of the phase detection pixels further comprises a light-shielding layer interposed between the photoelectric conversion element and the color filter.

6. The display device of claim 5, wherein a sub pixel group comprises a first pixel and a second pixel among the plurality of pixels,
wherein the first pixel and the second pixel are adjacent to each other in a row direction,
wherein the first pixel comprises a first light-shielding layer and the second pixel comprises a second light-shielding layer, and
wherein the first light-shielding layer and the second light-shielding layer are symmetric with respect to a boundary between the first pixel and the second pixel.

7. The display device of claim 5, wherein a sub pixel group comprises a first pixel and a second pixel among the plurality of pixels, wherein the first pixel and the second pixel are adjacent to each other in a column direction, wherein the first pixel comprises a first light-shielding layer and the second pixel comprises a second light-shielding layer, wherein the first light-shielding layer is formed in a first region in the first pixel and the second light-shielding layer is formed in a second region in the second pixel, and wherein the first region and the second region do not correspond to each other.

8. The display device of claim 1, wherein each of the plurality of pixels comprises a first photoelectric conversion element and a second photoelectric conversion element disposed on a substrate.

9. The display device of claim 8, wherein each of the plurality of pixels further comprises:

a color filter disposed on the first photoelectric conversion element and the second photoelectric conversion element; and a micro-lens disposed on the color filter.

10. The display device of claim 1, wherein the pixel array comprises a first pixel group and a second pixel group, each of which comprises a plurality of image pixels configured to generate the fingerprint image signal, wherein the first pixel group comprises a first phase detection pixel pair which comprises first phase detection pixels arranged adjacent to each other in a first direction and having a first micro-lens disposed thereon, wherein the second pixel group comprises a second phase detection pixel pair which comprises second phase detection pixels arranged adjacent to each other in a second direction different from the first direction and having at least one second micro-lens disposed thereon, and wherein the first phase detection pixel pair and the second phase detection pixel pair are configured to generate the fingerprint phase signal.

11. The display device of claim 10, wherein the first direction and the second direction are perpendicular to each other.

12. The display device of claim 10, wherein each of the plurality of display pixels comprises a respective micro-lens.

13. The display device of claim 12, wherein the first phase detection pixel pair comprises a first color filter configured to transmit light corresponding to a first color, and wherein the second phase detection pixel pair comprises a second color filter configured to transmit light corresponding to a second color different from the first color.

14. The display device of claim 10, wherein, the second pixel group is arranged adjacent to the first pixel group in the second direction, and wherein the first direction is a horizontal direction and the second direction is a vertical direction.

15. The display device of claim 1, wherein the pixel array comprises a plurality of pixel groups, and wherein each of the plurality of pixel groups comprises:

n first pixels arranged in a first direction, n being an integer greater than one;

n second pixels arranged in a second direction perpendicular to the first direction; and a single micro-lens disposed on the n*n pixels.

16. The display device of claim 1, wherein the fingerprint recognition sensor further comprises a lens configured to concentrate the reflected light received through the fingerprint recognition window.

17. The display device of claim 1, wherein the image sensor further comprises a sensor driver, and wherein the sensor driver is configured to:

control the pixel array;

perform the fingerprint authentication operation based on the fingerprint image signal and the fingerprint phase signal; and provide the main processor with a result of the fingerprint authentication operation.

18. A display device comprising:

a display panel comprising a plurality of display pixels;

a fingerprint recognition sensor comprising an image sensor disposed under a first surface of the display panel at a location spatially corresponding to a fingerprint recognition window of the display panel; and a main processor configured to control the display panel and the fingerprint recognition sensor, wherein a portion of display pixels among the plurality of display pixels are configured to emit light in a fingerprint recognition mode, the portion of display pixels corresponding to the fingerprint recognition window, wherein the image sensor comprises a pixel array with a plurality of pixels, at least a portion of the plurality of pixels comprises phase detection pixels and the image sensor is configured to generate a fingerprint image signal and a fingerprint phase signal based on reflected light of a fingerprint, received through the fingerprint recognition window while the portion of display pixels emit light, and wherein the main processor is further configured to:

perform any one or any combination of an anti-spoofing operation and a fingerprint authentication operation based on the fingerprint image signal and the fingerprint phase signal, the anti-spoofing operation being associated with determining whether the fingerprint is counterfeited;

perform training to generate learning data based on a first fingerprint image signal and a first fingerprint phase signal generated by the image sensor according to a user fingerprint, and based on a second fingerprint image signal and a second fingerprint phase signal generated by the image sensor according to a fake fingerprint; and perform the anti-spoofing operation by comparing the fingerprint image signal and the fingerprint phase signal corresponding to the fingerprint with the learning data.

* * * * *